United States Patent [19]
Oku et al.

[11] Patent Number: 6,084,637
[45] Date of Patent: *Jul. 4, 2000

[54] DECODING AND DISPLAYING DEVICE FOR CODED PICTURE DATA

[75] Inventors: Masuo Oku, Kamakura; Yukitoshi Tsuboi, Yokohama, both of Japan

[73] Assignee: Hitachi, Ltd., Tokyo, Japan

[*] Notice: This patent is subject to a terminal disclaimer.

[21] Appl. No.: 09/285,750

[22] Filed: Apr. 5, 1999

Related U.S. Application Data

[63] Continuation of application No. 08/882,412, Jun. 25, 1997, Pat. No. 5,907,372.

[30] Foreign Application Priority Data

| Jun. 28, 1996 | [JP] | Japan | 8-169594 |
| Jul. 19, 1996 | [JP] | Japan | 8-190966 |
| Feb. 19, 1997 | [JP] | Japan | 9-034961 |

[51] Int. Cl.[7] .................................................. H04N 7/01
[52] U.S. Cl. ........................... 348/445; 348/458; 348/913
[58] Field of Search .................................... 348/445, 458, 348/556, 913, 409, 416, 426, 716, 714

[56] References Cited

U.S. PATENT DOCUMENTS

| 5,488,432 | 1/1996 | Guillon et al. |
| 5,596,376 | 1/1997 | Howe . |
| 5,646,693 | 7/1997 | Cismas . |
| 5,717,461 | 2/1998 | Hoogenboom . |
| 5,729,303 | 3/1998 | Oku et al. . |
| 5,754,243 | 5/1998 | Kurihara et al. ........................ 348/445 |
| 5,825,424 | 10/1998 | Canfield et al. ....................... 348/445 |
| 5,832,124 | 11/1998 | Sato et al. ............................... 348/445 |
| 5,880,736 | 6/1995 | Oku et al. . |

FOREIGN PATENT DOCUMENTS

| 8-18953 | 1/1996 | Japan . |
| 8-23514 | 1/1996 | Japan . |

OTHER PUBLICATIONS

"MPEG Video Coding", Journal of the Television Society, Nakajima et al, vol. 49, No. 4, 1955, pp. 435–466.

"Chapter 5–MPEG1" and "Chapter 6–MPEG2", Fundamentals of Digital Picture Image, Watanabe et al, Nikkei BP Publication Center, Jan. 20, 1995, pp. 135–199.

*Primary Examiner*—Victor R. Kostak
*Attorney, Agent, or Firm*—Beall Law Offices

[57] ABSTRACT

In a decoding/displaying device, the memory capacity or mapping to B pictures is set in consideration of a decoding waiting period, thereby avoiding the competition between a write-in operation and a read-out operation for a memory. Therefore, the decoding operation of coded picture data can be performed with no decoding waiting period.

10 Claims, 29 Drawing Sheets

| AREA | CAPACITY |
|---|---|
| REFERENCE PICTURE AREA (1) | 507 Kbyte |
| REFERENCE PICTURE AREA (2) | 507 Kbyte |
| B PICTURE AREA | 557 Kbyte |
| OSD DATA AREA | 245 Kbyte |
| CODED AUDIO DATA AREA | 8 Kbyte |
| CODED PICTURE DATA BUFFERING AREA | 224 Kbyte |

| AREA | CAPACITY |
| --- | --- |
| REFERENCE PICTURE AREA (1) | 608 Kbyte |
| REFERENCE PICTURE AREA (2) | 608 Kbyte |
| B PICTURE AREA | 346 Kbyte |
| OSD DATA AREA | 254 Kbyte |
| CODED AUDIO DATA AREA | 8 Kbyte |
| CODED PICTURE DATA BUFFERING AREA | 224 Kbyte |

| AREA | CAPACITY (NTSC) | CAPACITY (PAL) |
|---|---|---|
| REFERENCE PICTURE AREA (1) | 507 Kbyte | 608 Kbyte |
| REFERENCE PICTURE AREA (2) | 507 Kbyte | 608 Kbyte |
| B PICTURE AREA | 456 Kbyte | 545 Kbyte |
| OSD DATA AREA | 333 Kbyte | 55 Kbyte |
| CODED AUDIO DATA AREA | 8 Kbyte | 8 Kbyte |
| CODED PICTURE DATA BUFFERING AREA | 224 Kbyte | 224 Kbyte |

| AREA | CAPACITY |
| --- | --- |
| REFERENCE PICTURE AREA (1) | 608 Kbyte |
| REFERENCE PICTURE AREA (2) | 608 Kbyte |
| B PICTURE AREA | 323 Kbyte |
| OSD DATA AREA | 277 Kbyte |
| CODED AUDIO DATA AREA | 8 Kbyte |
| CODED PICTURE DATA BUFFERING AREA | 224 Kbyte |

DECODING AND DISPLAYING DEVICE FOR CODED PICTURE DATA

This is a continuation application of U.S. Ser. No. 08/882,412, filed Jun. 25, 1997 now U.S. Pat. No. 5,907,372.

BACKGROUND OF THE INVENTION

1. Field of the Invention

The present invention relates to a decoding/displaying device for decoding and displaying coded picture data which are generated by high-efficiency coding means using interframe correlation, and particularly to a device which can perform a continuous decoding operation and is suitable for use in implementing a function of converting 16:9 signals to letter-box signals, an audio data decoding function and an OSD (On Screen Display) function.

2. Description of Related Art

The data amount of picture data has recently increased more and more. In order to reduce the transmission or recording cost, these data are compressed by high-efficiency coding means for removing redundancy, etc., and then the coded picture data are transmitted or recorded. The high-efficiency coding means is briefly described in "MPEG Video Coding" *Journal of the Television Society*, vol. 49, No. 4 (1995), pp.435–466, by Nakajima et al., "Fundamentals of Digital Picture Compression" written by Yasuda and Watanabe, published by Nikkei BP Publication Center (Jan. 20, 1996), pp135–200, etc. The MPEG system which is standardized in ISO/SC29/WG11 has been well known. A decoding/displaying device for MPEG streams based on the MPEG system is disclosed in Japanese Patent Application Publication (Laid-open:KOKAI) No. Hei-8-18953 and No. Hei-8-23514.

In the coding based on the MPEG system, each frame of picture data is sectioned into an I picture (Intra Picture) which is coded without using a reference picture to be referred to as a prediction value, a P-picture (Predictive Picture) which is coded by using only pictures located at the forward side in the display order as reference pictures, and a B-picture (Bi-directional Picture) which is coded by using pictures located at the forward and rearward sides in the display order as reference pictures. In the actual coding operation, two reference pictures located at the forward and rearward sides must exist in the decoding operation of the B-picture, and the coding is performed after the pictures are skillfully rearranged (the order of the pictures is changed). Therefore, as shown in FIG. 15, it is necessary to decode the coded picture data (hereinafter a data stream containing coded picture data is referred to as "an MPEG stream") and then rearrange the data (i.e., arrange the data in a difference sequence) for display.

Therefore, in the decoding/displaying device, coded pictures which are transmitted in the coding order are successively decoded. However, the decoded data are temporarily stored in a memory and then rearranged so as to be in the display order. The decoded data of I and P pictures are required to be used as reference data for the subsequent decoding of B pictures, and thus it is necessary to store the picture data of two pictures in the memory. Further, in the case where one frame comprises two interlaced fields like television signals, even B pictures cannot be displayed simultaneously with the decoding operation thereof because one frame is coded as one picture. The frame data must be converted to field data, and thus the display operation must be delayed from the decoding operation by at least 0.5 frame period as shown in FIG. 15. Therefore, the decoded data are required to be temporarily stored in the memory to convert the frame data to the field data, and in order to satisfy this requirement, an extra memory area corresponding to one picture (=frame) is needed.

FIG. 14 is a diagram showing a memory which is required for the decoding of coded picture according to the MPEG system. The memory shown in FIG. 14 has a data width of 16 bits and a 16-Mbit memory capacity of 512 columns× 2048 rows. One row corresponds to 1 Kbyte (=1024 bytes). The 16-Mbit capacity memory is used as a general memory chip in various fields, and the fabrication of a decoding/ displaying device within the memory capacity range of 16 Mbytes is significant in cost.

The NTSC system of 720 horizontal pixels×480 vertical scan lines×the frame frequency of 30 Hz, and the PAL system of 720 horizontal pixels×576 vertical scan lines×the frame frequency of 25 Hz are used for picture signals to be compressed according to the MPEG system. FIG. 14 also shows a memory area sectioning style when the coded picture data corresponding to the PAL system having a large picture size are decoded. In the PAL system, 405 rows for brightness signals and 203 rows for color signals (the fractional portion is rounded up), a total of 608 rows, are needed for one frame, and the residual portion corresponding to three frames is used as a coded picture data buffer for temporarily storing the coded picture during the decoding operation. The capacity of the coded picture data buffer is equal to 1,835,008 bits (224 rows). This capacity value is the absolute minimum capacity which must always be maintained to ensure the optimum coding/decoding operation even in combination with a coding device and a decoding/ displaying device which are manufactured by different makers, and it is determined according to the MPEG system.

FIG. 13 shows a conventional decoding/displaying device for coded picture data. In FIG. 13, reference numeral 1 represents a timing/operation mode control circuit, reference numeral 2 represents a parser/variable-length decoding circuit of MPEG streams, reference numeral 3 represents an inverse quantization/IDCT (Inverse Cosine Transform) circuit, reference numeral 4 represents a motion compensation circuit, reference numeral 5 represents a display circuit, reference numeral 6 represents a coded picture data write-in control circuit, reference numeral 7 represents a coded picture data read-out control circuit, reference numeral 8 represents a reference data readout control circuit, reference numeral 9 represents a decoded data write-in control circuit, reference numeral 10 represents a display picture data read-out control circuit, and reference numeral 11 represents a memory.

An MPEG stream is input to the parser/variable-length decoding circuit 2, and coded picture data are stored through the coded picture data write-in control circuit 6 into a coded picture data buffer area of the memory 11. The timing/ operation mode control circuit 1 has not only a function of setting an operation mode, etc. for each block, but also a function of adjusting competition of data buses of the memory 11. The coded picture data read-out control circuit 7 reads out the coded picture data stored in the coded picture data buffer area in a stored order at a rate of approximately one picture (=frame) per frame period in synchronism with a synchronous signal of a display system.

The coded picture data which are read out from the memory 11 through the coded picture data read-out control circuit 7 are input into the parser/variable-length decoding circuit 2 again. The parser portion of the parser/variable-length decoding circuit 2 extracts system header information of the MPEG stream and coded mode information in a header portion of the coded picture data, and the information thus extracted is used in an internal variable-length decoding portion. In addition, the parser portion outputs the information to the timing/operation mode control circuit 1 to set the operation mode of each of the inverse quantization/IDCT circuit 3, the motion compensation circuit 4, and the display circuit 5. The variable-length decoding portion of the parser/variable-length decoding circuit 2 mainly decodes the coefficient data, etc. of the cosine transformation which have been subjected to the variable-length coding, and transmits the data thus decoded to the inverse quantization/IDCT circuit 3. Further, the inverse quantization/IDCT circuit 3 returns the coefficient data to a suitable scale in an inverse quantization portion, and converts the data to picture data in an IDCT portion.

The motion compensation circuit 4 reads out from the memory 11, through the reference data read-out control circuit 8, reference data (the decoded data of reference pictures) for motion compensation by using motion vector information in the coded mode information which is obtained by the parser/variable-length decoding circuit 2. The reference data are added to the picture data which are generated in the inverse quantization/IDCT circuit 3 to obtain decoded data. The decoded data are written into the memory 11 through the decoded data write-in control circuit 9. However, when the decoded data are the picture data of the I or P picture, one of the two reference picture areas of the memory in which older reference data are stored is updated. When the decoded data are the picture data of the B picture, the data are written into the B picture area.

The decoded data which are decoded and written into the memory 11 as described above are read out as display data by using the display data read-out control circuit 10, and transmitted to the display circuit 5. The display circuit 5 outputs the display data read out as decoded picture data from the memory 11 in synchronism with a synchronous display signal.

The operation of the conventional device will be described on the basis of the write-in and read-out operations of picture data of the above-described three pictures into the memory area (hereinafter referred to as "frame memory") with reference to FIG. 17.

In the MPEG system, there have been known a coding case in which the coding is performed in the order of I1, B2, B3, P4, B5, B6, P7, (numeral represents the display order) and a coding case in which the coding is performed with only I and P frames in the order of I1, P2, P3, P4, . . . However, an irregular arrangement pattern which does not conform to the regular order as described above is also permitted. FIG. 17 shows such an irregular arrangement pattern.

As shown in (e) of FIG. 17, each frame is assumed to be coded in the display order of I1, B2, B3, P4, P5, P6, . . . Further, in FIG. 17, the decoding operation of writing the decoded picture data into each frame memory (hereinafter referred to as FM1, FM2, FM3) is shown as being performed twice.

Each frame memory FM1, FM2, FM3 is illustrated as being divided into memory images of two field memories M1, M2 at the upper and lower sides. The upper half M1 corresponds to a field memory for a first field, and the lower half M2 corresponds to a field memory for a second field. A memory image in which the address is increased in the raster scanning order from the upper side to the lower side in the direction of arrows is shown for each of the field memories M1, M2.

The frame memories FM1, FM2 are used as frame memories for reference pictures, and the frame memory FM3 is used as a frame memory for B pictures. The arrows which are directed downwardly from (a) of FIG. 17 to (b), (c) or (d) of FIG. 17 indicate decoding and writing operations, the arrows which are directed upwardly from (b), (c) or (d) of FIG. 17 to (a) of FIG. 17 indicate a reference read-out operation, and the arrows which are directed downwardly from (b), (c) or (d) of FIG. 17 to (e) of FIG. 17 indicate a display read-out operation.

In the prior art, the decoding operation is progressed on a macro block basis according to a fixed time slot, and three types of memory accesses occur during the progress of the decoding operation. The decoding and writing operation is performed to write decoded picture data which are decoded on a macro block basis. The writing progress in the decoding and writing operation is not continuous, but discontinuity of addresses occurs during the progress. However, in the decoding and writing operation over one frame, the writing address is gradually increased. In (b), (c) and (d) of FIG. 17, dense crosshatched lines each having a broad width (for example, line ① in (b) of FIG. 17) indicates the writing progress in the decoding and writing operation.

The reference read-out operation is performed to read out the decoded picture data of a reference frame as reference picture data on a macro block basis when the P frame and the B frame are decoded. The reading progress in the reference read-out operation is the same as the decoding and writing operation. In (b) and (c) of FIG. 17, thin crosshatched lines each having a broad width (for example, line ② in (b) of FIG. 17) indicate the reading progress in the reference reading operation. A positive or negative offset value is added to the read-out address in accordance with the value of the motion vector indicating the shift amount of the macro block, and thus the width is generally broader than in the case of the decoding and writing operation.

The display read-out operation is performed to read out the decoded picture data which are held in the frame memory. The reading progress in the display read-out operation is continuous. However, the display read-out operation is temporarily stopped during a vertical blanking period between first and second fields. In (b), (c) and (d) of FIG. 17, a bold solid line (for example, line (3) in (b) of FIG. 17) indicates the reading progress of the display and read-out operation.

First, in a period T1 (one frame period), when an I1 frame is decoded, the respective data of the two fields of the decoded I1 frame are simultaneously written into the different field memories M1 and M2 of the frame memory FM1 as shown in (b) of FIG. 17 (decoding and writing operation ①).

In a next period T2 (one frame period), a P4 frame is decoded. In this case, as shown in (b) of FIG. 17, the I1 frame which is decoded from the frame memory FM1 is read out (reference read-out operation ②), and the P4 frame is decoded by using the read-out I1 frame as a reference frame. As shown in (c) of FIG. 17, the respective data of two fields of the decoded P4 frame are simultaneously written into the different field memories M1, M2 of the frame memory FM2.

In the last one field period of the period T2, as shown in (b) and (e) of FIG. 17, the first field of the Ii frame decoded from the upper half field memory M1 of the frame memory FM1 is read out (display read-out operation ③), and set as the first field of the I1 frame in the decoded picture data to be displayed.

In a next period T3 (one frame period), the B2 frame is decoded. In this case, as shown in (b) and (c) of FIG. 17, the I1 frame decoded from the frame memory FM1 and the P4 frame decoded from the frame memory FM2 are respectively read out, and the B2 frame is decoded by using the I1 frame and the P4 frame thus read-out as reference frames. The data of two fields of the decoded B2 frame are simultaneously written into the different field memories M1 and M2 of the frame memory FM3 as shown in (d) of FIG. 17. In this period T3, as shown in (b) and (e) of FIG. 17, the second field of the I1 frame which is decoded from the lower half field memory M2 of the frame memory FM1 are read out during the first half of period T3 (first field period), and as shown in (d) and (e) of FIG. 17, the first field of the B2 frame which is decoded from the upper half field memory M1 of the frame memory FM3 is read out during the last half of period T3 (second field period). These fields thus read out are set as the second field of the I1 frame and the first field of the B2 frame respectively in the decoded picture data to be displayed.

In a next period T4 (one frame period), the B3 frame is likewise decoded, and written into the frame memory FM3 as shown in (d) of FIG. 17. At this time, the second field of the B2 frame decoded from the lower half field memory M2 of the frame memory FM3 is read out in the first half of the period T4 (first field period), and the first field of the B3 frame decoded from the upper field memory M1 of the frame memory FM3 is read out in the last half of period T4 (second field period). These fields are set as the second field of the B2 frame and the first field of the B3 frame respectively in the decoded picture data to be displayed.

In a next period T5 (one frame period), the P5 frame is decoded. In this case, as shown in (c) of FIG. 17, the P4 frame decoded from the frame memory FM2 is read out, and the P5 frame is decoded by using the P4 frame as a reference frame. The data of the two fields of the decoded P5 frame are simultaneously written into the field memories M1, M2 of the frame memory FM1 as show in (b) of FIG. 17. In the first half of the period T5, the second field of the B3 frame decoded from the lower half field memory M2 of the frame memory FM3 is read out as shown in (d) and (e) of FIG. 17, and in the last half of the period T5, the first field of the P4 frame decoded from the upper half field memory M1 of the frame memory FM2 is read out as shown in (c) and (e) of FIG. 17. These fields are set as the second field of the B3 frame and the first field of the P4 frame respectively in the decoded picture data to be displayed.

In a next period T6 (one frame period), the P6 frame is decoded. The P5 frame written into the frame memory FM1 is used as a reference frame for the P6 frame. In this case, the P5 and P6 frames correspond to the I1 and P4 frames respectively, and the same decoding processing as the I1 and P4 are performed on the P5 and P6 frames. Further, the decoding of an I or P frame subsequent to the above frames is performed by using the decoded P6 frame as a reference frame.

As described above, the frame decoding order as shown in (a) of FIG. 17 is converted to a frame display order which is suitable for the display as shown in (e) of FIG. 17.

FIG. 16 relates to the case where the B frames are sequential in the decoding/displaying processing, and shows the motion of the memory address of the frame memory FM3 for B frames. In FIG. 16, the memory address increases upwardly with the time lapse as indicated by arrows (this is just inverse to FIG. 17). The most minute grid on the ordinate axis in FIG. 16 corresponds to the block size for coding (8 lines in field). In FIG. 16, the number of blocks in one frame is not accurately illustrated. As shown in FIG. 16, the read-out of the display data is performed by reading out the data while successively incrementing the addresses of areas which are exclusively allocated to the respective fields in correspondence to the display period of each field. On the other hand, the write-in operation of the decoded data is performed over two fields and with an address width corresponding to the width of a block as indicated by a rectangle, because the coding is performed on a two-dimensional block basis after two fields are integrated into one picture (=frame). Further, the decoding operation is stopped (suspended) for a period containing a vertical blanking period at the switch point between the pictures in order to avoid competition between the read-out address and the write-in address in which the read-out address outpaces the write-in address.

SUMMARY OF THE INVENTION

However, the provision of the decoding waiting period shortens the decoding period of the coded picture data, and thus it is necessary to perform the decoding operation at high speed. The increase in the processing speed brings about an enlargement of the circuit scale. Further, following the increase in the speed of the decoding operation, the reference data read-out control circuit 7 and the decoded data write-in control circuit 8 are required to perform high-speed reading and writing operations from/to the memory 11, so that a memory which can be accessed at high speed is needed. These factors greatly obstruct the aim of implementing a decoding/displaying device for coded picture data at low cost.

Particularly, when there is achieved a display function of reducing the number of scan lines for the picture data having an aspect ratio of 16:9 to three-fourths thereof in the vertical direction to convert the picture data to a letter-box picture, this is equivalent to an increase of the vertical blanking period, and the problem becomes more critical.

Further, the prior art has the decoding and displaying function of the coded picture data, and it is preferable that the decoding function of audio data contained in the MPEG stream and the OSD (On Screen Display) function which provides a user using the device with a graphical user interface while being overlaid on the display data of a picture can be implemented without increasing the memory capacity.

In order to solve the above problem, the present invention mainly uses the following construction.

A decoding/displaying device for decoding coded picture data which are coded every block of M pixels×N scan lines (M, N represent integers, and N is equal to an even number) on the basis of any one of three picture types of an intra-frame picture needing no reference picture, an inter-frame picture based on only pictures located in the forward direction in a display order as reference pictures, and a bi-directional picture based on pictures located in the forward and rearward directions in the display order as reference pictures, includes decoding means for receiving and decoding coded picture data; memory means for storing and holding the coded picture data and decoded data obtained by the decoding means; display means for reading out the decoded data from the memory means and outputting display data; and control means for controlling the operation timing of the decoding means and the display means; wherein the memory means has first and second frame memory areas for storing the decoded picture data of at least an I frame picture or a P picture, and a third frame memory area for storing the decoded picture data of the B picture; the decoding means has means for writing the decoded data in the three frame memory areas in accordance with the picture type of the coded picture data, and means for reading out the reference data from the first and second frame memory areas; the display means has means for reading out the decoded picture data stored in the first to third frame memory areas as interlaced display data; and wherein at least the third frame memory area of the memory means is set to have a memory capacity larger than the sum of the picture size of one picture and the amount corresponding to the number of blocks which can be decoded during one vertical blanking period and the scan period corresponding to the number of scan lines (=N) of the blocks, and the control means controls the decoding means to start the decoding operation of the coded picture data of one picture preceding the vertical blanking period of the display picture, for example, by N/2 scan line period, or there is provided memory map switching means for dividing the third frame memory area of the memory means into plural memory units, rearranging the memory units so that plural kinds of memory maps can be selected, and switching a memory map applied to each frame memory according to a predetermined rule every time the decoded picture data held in the frame memory are renewed.

DETAILED DESCRIPTION OF THE PREFERRED EMBODIMENTS

Preferred embodiments according to the present invention will be described hereunder with reference to the accompanying drawings.

Figure 1:
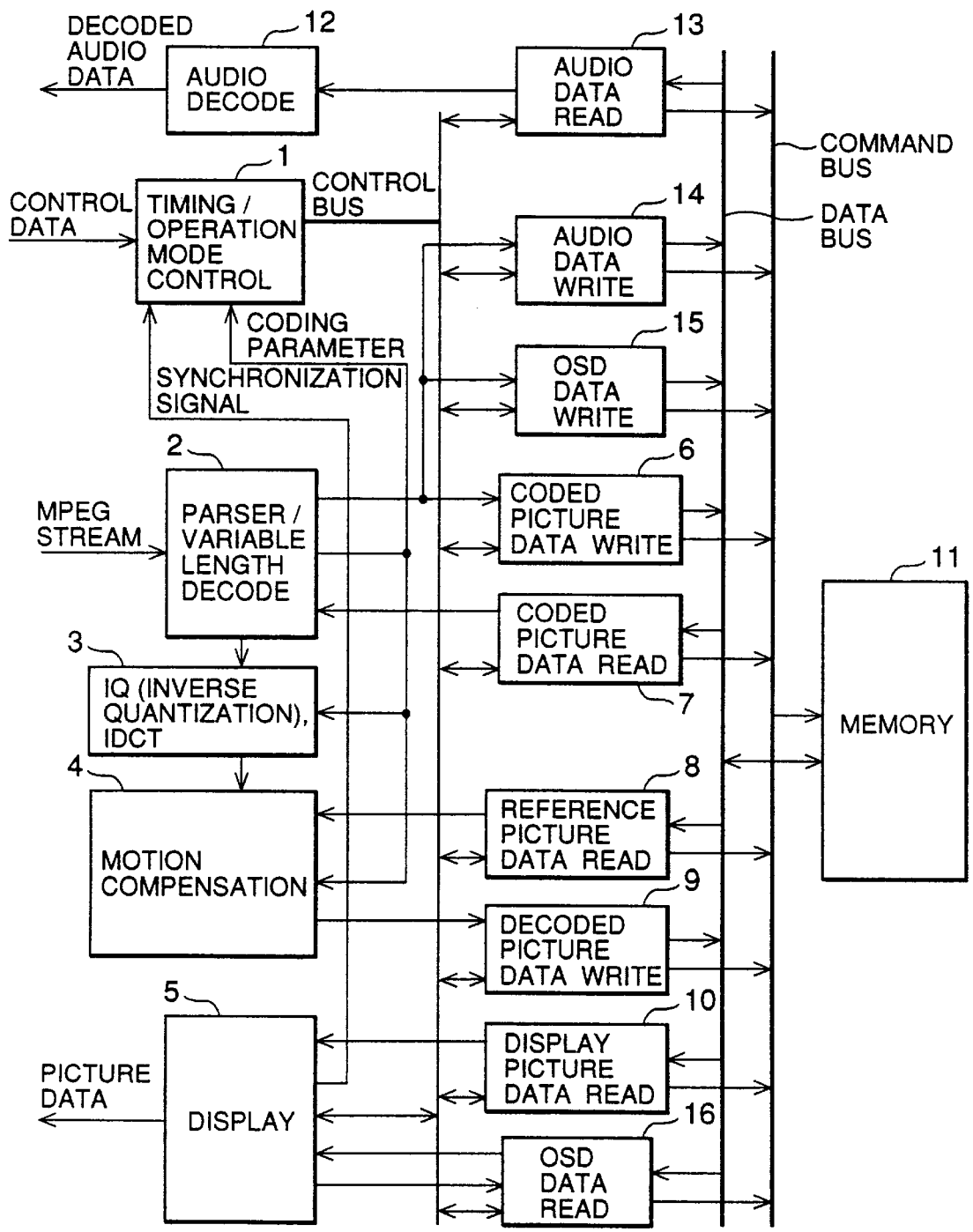
FIG. 1 is a diagram showing a decoding/displaying device of coded picture data according to the present invention.

FIG. 1 shows a first embodiment of a decoding/displaying device for coded picture data according to the present invention. In FIG. 1, reference numeral 1 represents a timing operation mode control circuit, reference numeral 2 represents a parser/variable-length decoding circuit, reference numeral 3 represents an inverse quantization (IQ) IDCT circuit, reference numeral 4 represents a motion compensation circuit, reference numeral 5 represents a display circuit, reference numeral 6 represents a coded picture data write-in control circuit, reference numeral 7 represents a coded picture data read-out control circuit, reference numeral 8 represents a reference data read-out control circuit, reference numeral 9 represents a decoded data write-in control circuit, reference numeral 10 represents a display data read-out control circuit, reference numeral 11 represents a memory, reference numeral 12 represents an audio decoding circuit, reference numeral 13 represents an audio data read-out control circuit, reference numeral 14 represents an audio data write-in control circuit, reference numeral 15 represents an OSD data write-in control circuit, and reference numeral 16 represents an OSD data read-out control circuit.

The MPEG stream is input to the parser/variable-length decoding circuit 2, and stored through the coded picture data write-in control circuit 6 into the coded picture data buffer area of the memory 11. The timing operation mode control circuit 1 sets the operation mode of each block, etc., and also adjusts the competition among data buses for the memory 11. The coded picture data read-out control circuit 7 reads out the coded picture data stored in the coded picture data buffer area in the storing order substantially at the rate of one picture (=frame) per frame period in synchronism with the synchronous signal of the display system.

The coded picture data read out from the memory 11 are input to the parser/variable-length decoding circuit 2. The parser portion of the parser/variable-length decoding circuit 2 extracts the coded mode information in the header portion of the coded picture data to use the information in the variable-length decoding portion, and outputs the information to the timing operation mode control circuit 1 to set the operation mode of each of the inverse quantization IDCT circuit 3, the motion compensation circuit 4, the display circuit 5, etc. The variable-length decoding portion of the parser/variable-length decoding circuit 2 decodes the coefficient data, etc. of the cosine conversion which are mainly subjected to the variable-length coding, and then transmits the data to the inverse quantization IDCT circuit 3. The inverse quantization IDCT circuit 3 returns the coefficient data to a suitable scale in the inverse quantization portion, and converts the data to the picture data in the IDCT portion.

In the motion compensation circuit 4, the reference data of reference pictures are read out from the memory 11 through the reference data read-out control circuit 8 for motion compensation by using motion vector information in the coded header information which is obtained by the parser/variable-length decoding circuit 2. Further, the reference data are added to the picture data generated in the IDCT portion to obtain decoded data. The decoded data are written into the memory 11 through the decoded data write-in control circuit 9. When the decoded data are the picture data of the I or P picture, one of the two reference picture areas of the memory 11 in which older data are stored is renewed, and when the decoded data are the picture data of the B picture, the data are written into the B picture area.

The decoding operation is performed as described above, and the decoded data written in the memory 11 are read out as display data by using the display data read-out circuit 10, and then transmitted to the display circuit 5. The display circuit 5 subjects the display data read out from the memory 11 to pixel rate conversion processing, for example. Further, the display circuit 5 displays the OSD data read out from the memory 11 through the OSD data read-out control circuit 16 in a overlay display mode, and then outputs the data as picture data.

Figures 2, 3:
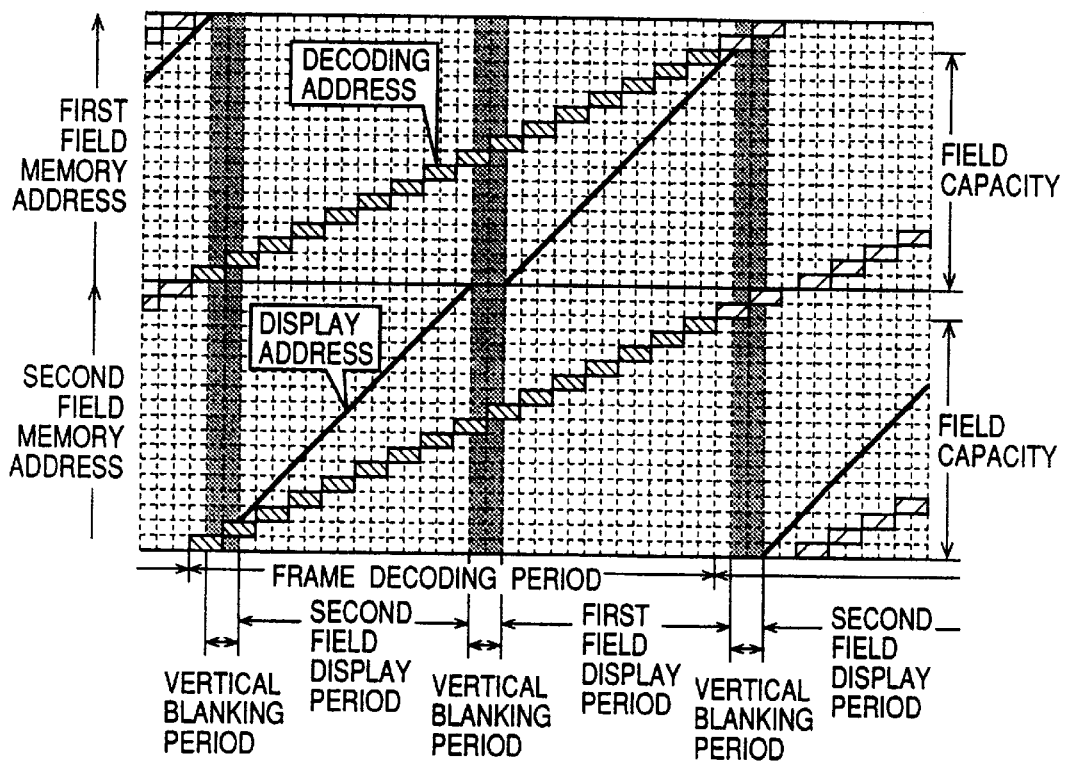
FIG. 2 is a diagram showing memory area division of a first embodiment.
FIG. 3 is a diagram showing the memory control of a B picture area of the first embodiment.
Figure 14:
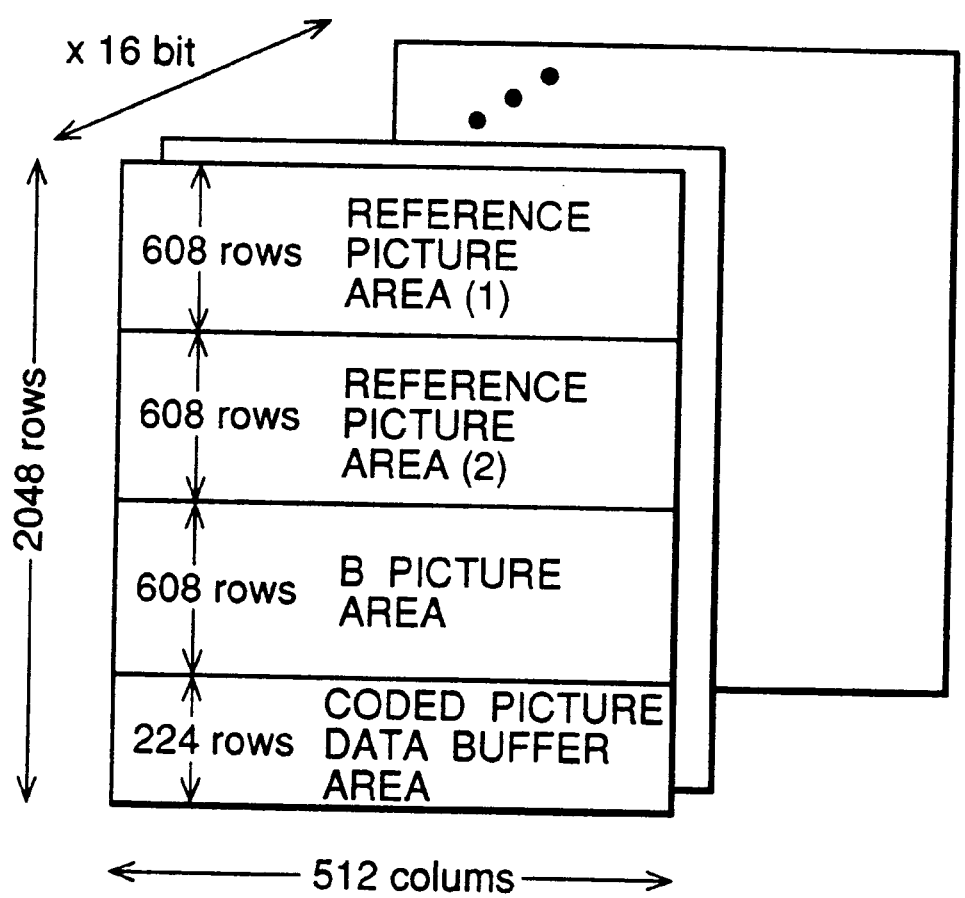
FIG. 14 is a diagram showing the memory area division of the prior art.
Figure 15:
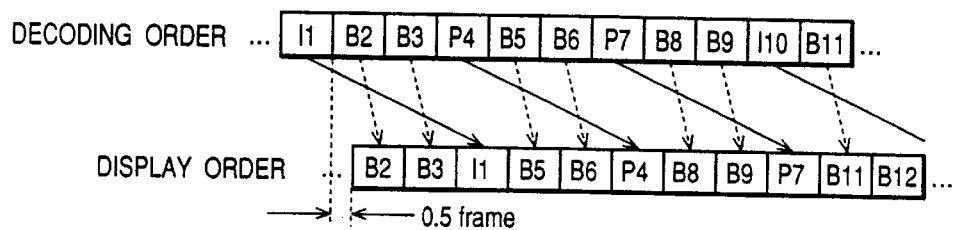
FIG. 15 is a diagram showing the decoding order and the display order in MPEG stream.
Figure 16:
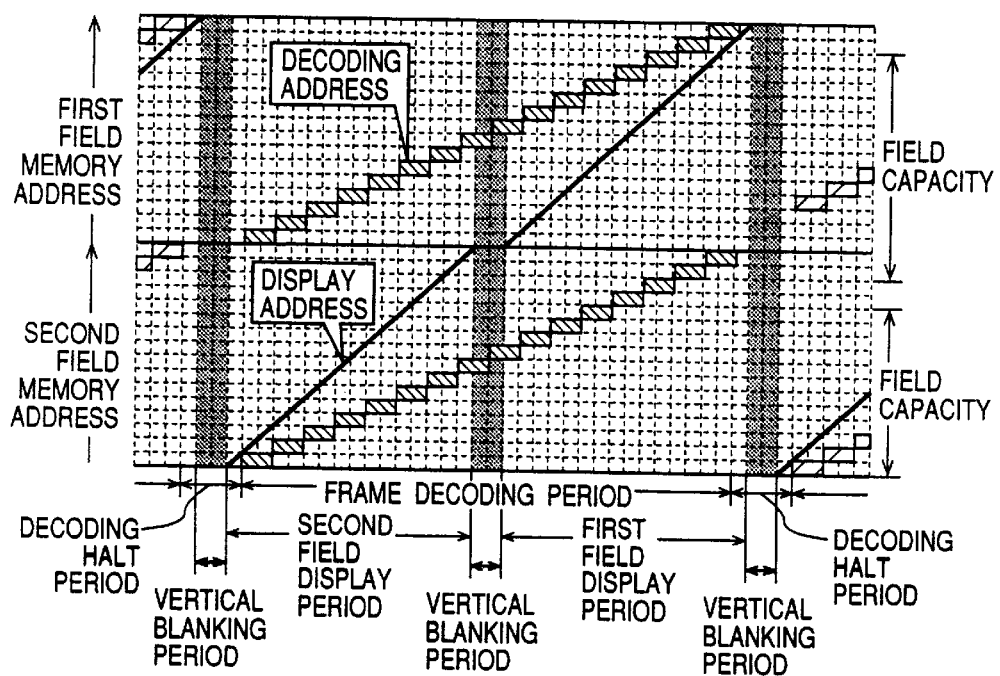
FIG. 16 is a diagram showing the memory control of the B picture area of the prior art.

FIG. 2 is a diagram showing an area allocation of the memory 11 in consideration of storage of OSD data in the case of the NTSC system. Each of the two reference picture areas has a full picture size, and its picture size is set to be smaller than in the PAL system shown in FIG. 14, so that the picture size thereof is reduced to 507 Kbytes/picture. With respect to the coded picture data buffer area, the same as shown in FIG. 2 is satisfied. For the B picture area, the memory capacity to be allocated is increased by the number of blocks (in this embodiment, 50 Kbytes) which can be decoded for the time corresponding to the decoding waiting period shown in FIG. 16, as compared with the picture size, and thus it is set to 557 Kbytes. In addition, by utilizing the fact that the picture size of the NTSC system is smaller than that of the PAL system, 245 Kbytes is allocated to the OSD data area for storing the OSD data, and 8 Kbytes is allocated to the audio data area for temporarily storing the coded audio data.

FIG. 3 shows the memory control system for the B picture area. The ordinate axis of FIG. 3 represents the memory address, and the abscissa of FIG. 3 represents the time. As shown in FIG. 3, the write-in operation of the decoded data is performed in precedence to the read-out operation of the display data, and also in precedence to the vertical blanking period. In order to reduce the memory capacity by the amount corresponding to the increase of the memory capacity to be allocated to the B picture area, the period of time by which the write-in operation precedes the vertical blanking period is preferably set to a period required to decode 0.5 macro block line (an assembly of macro blocks each serving as a block unit for coding and having a size of 16 pixels×16 lines, which are arranged on a line in the lateral direction of the screen, is referred to as "1 macro block line"). The memory area is set to be larger than the picture size, and used as a cyclic type memory. As a result, no competition occurs between the write-in operation and the read-out operation, and the continuous write-in operation of the decoded data, that is the continuous decoding operation, can be performed.

In this embodiment, in addition to the decoding/displaying operation of the coded picture data, the decoding of the coded audio data and the display of the OSD data can be performed. The coded audio data are contained in the MPEG stream, separated in the parser portion of the parser/variable-length decoding circuit 2, transmitted to the audio data write-in control circuit 14, and then stored in the audio data area of the memory 11. The coded audio data thus stored are read out by the audio data read-out control circuit 13 on the basis of an instruction of the timing operation mode control circuit 1, decoded in the audio decoding circuit 12, and then output as decoded audio data.

Like the MPEG stream, the OSD data are input to the parser/variable-length decoding circuit 2, separated in the parser portion, and then written into the OSD data area of the memory 11 by the OSD data write-in control circuit 15. On the basis of an instruction of the display circuit 5, the OSD data written in the OSD data area are read out by the OSD data read-out control circuit 16 in synchronism with the display data read out by the display data read-out control circuit 10, and multiplexed with the display data in the display circuit 5, and then output as picture data.

Next, a second embodiment according to the present invention will be described.

The decoding/displaying device of this embodiment is substantially identical to the decoding/displaying device shown in FIG. 1, except for the difference in the area division of the memory 11 and the control method for the B picture.

Figures 4, 5:
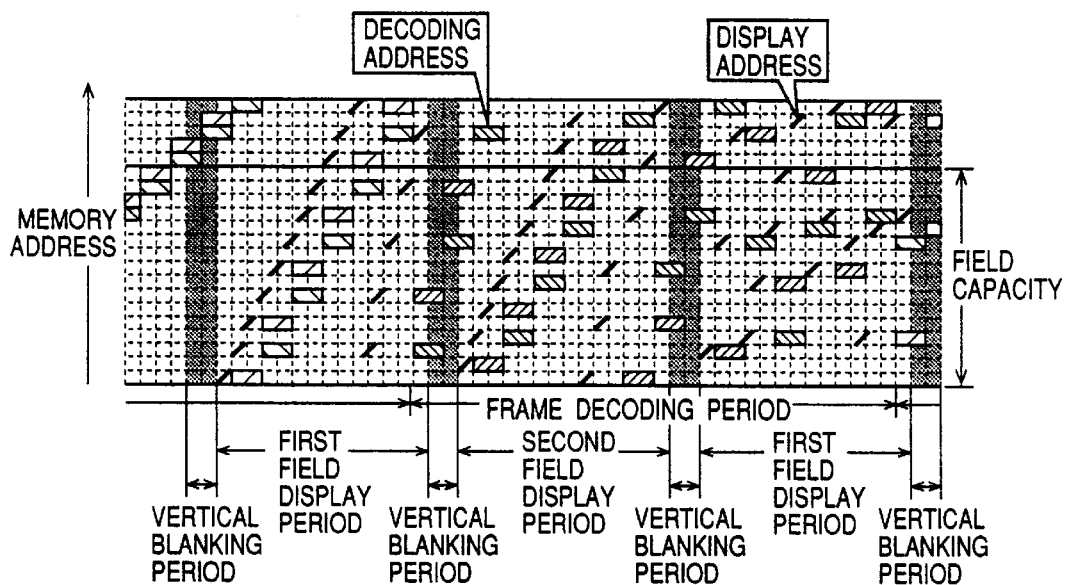
FIG. 4 is a diagram showing the memory area division of a second embodiment.
FIG. 5 is a diagram showing the memory control of a B picture area of the second embodiment.

FIG. 4 shows an area dividing method for the memory 11 in the case of the PAL system, and this area dividing method may be applied to the NTSC system. FIG. 5 shows a memory control method. The picture size of the PAL system is larger than that of the NTSC system as described above. Therefore, the capacity exceeding one frame cannot be allocated to the B picture area unlike the first embodiment.

In this embodiment, the same effect as the first embodiment can be obtained in the PAL system. Therefore, according to this embodiment, one-field capacity plus alpha is allocated to the B picture area. The alpha is equal to the sum of at least the amount corresponding to the number of blocks which can be decoded for the time corresponding to the decoding waiting period shown in FIG. 16 and the amount corresponding to 0.5 block line.

As in the case of the embodiment shown in FIG. 3, the write-in operation of the decoded data is performed in precedence to the vertical blanking period as shown in FIG. 5. In FIG. 5, the time period by which the write-in precedes the vertical blanking period corresponds to the period required to decode the 0.5 block line, and this value is effective in reducing the memory capacity of the B picture area. In the memory control system of this embodiment, the 0.5 macro block line is set as a unit, and the memory area is divided into plural sub areas on the basis of this unit. The timing operation mode control circuit 1 manages allowance or prohibition of the write-in operation to each sub area, and instructs a writable sub area to the decoded data write-in control circuit 9 to write the decoded data into the memory 11. After the write-in is finished, the sub area concerned is prohibited from being written to (i.e., the sub area is classified to the write-in impossible state) and the management for the read-out is performed. In the read-out management, the decoded data stored in the sub area are read out as display data in the display order. After the display is finished, the sub area concerned is allowed to be written again (i.e., the sub area is classified to the write-in possible state). The capacity of the plus alpha portion corresponds to the sum of the amount corresponding to the number of blocks which can be decoded for the time corresponding to the decoding waiting period and the amount corresponding to the 0.5 macro block line, and it is apparent from FIG. 5 that a writable sub area exists at any timing.

As a result, the continuous decoding operation is ensured, and the audio data area and the OSD data area can be kept in the memory 11, so that the decode/output of the coded audio data and the multiplexing of the OSD data to the display picture data can be performed.

Next, a third embodiment according to the present invention will be described with reference to FIGS. 6, 7, 10A, 10B, 11 and 12.

Figure 11:
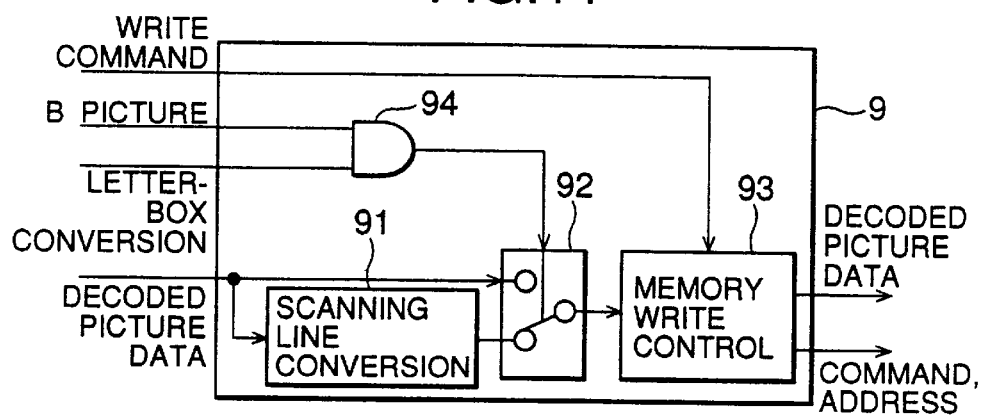
FIG. 11 is a diagram showing an example of a decoding data writing control circuit which can be subjected to the letter-box conversion.

This embodiment relates to a device having a function of converting to pictures (letter-box pictures) which are compressed to ¾ in the longitudinal direction of the screen when a wide aspect picture which is assumed to be displayed on a monitor having an aspect ratio of 16:9 is displayed on a monitor having an aspect ratio of 4:3. The construction of the decoding/displaying device of this embodiment is substantially identical to the decoding/displaying device shown in FIG. 1. However, the instruction as to whether or not the letter-box picture conversion should be performed is supplied externally (not shown) to the timing operation mode control 1. The decoded data write-in control circuit 9 contains a scan line conversion circuit therein as shown in FIG. 11, and the display data read-out circuit 10 also contains a scan line conversion circuit therein as show in FIG. 12. The scan line conversion circuit is adapted to remove one scan line every four scan lines.

Figures 6, 7:
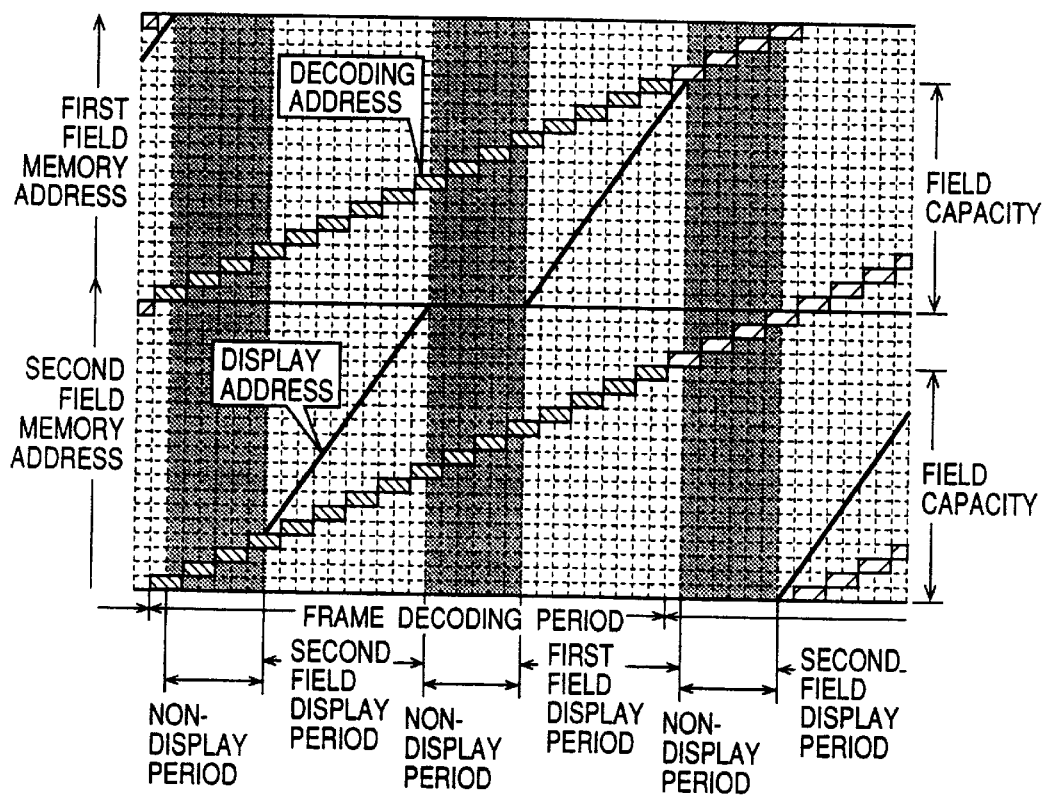
FIG. 6 is a diagram showing the memory area division of a third embodiment.
FIG. 7 is a diagram showing the memory control of the B picture area of the third embodiment.

FIG. 6 shows the area division in the memory 11 when the letter-box picture conversion is performed, and FIG. 7 shows the memory control method for the B picture when the letter-box picture conversion is performed. When no letter-box conversion is performed, the first or second embodiment is applied. The memory control method for the B picture is common between the NTSC system and the PAL system, but the memory allocation is different between the two.

As shown in FIG. 7, the memory control method to the B picture is basically identical to that of the first embodiment shown in FIG. 3, but the non-display period containing the vertical blanking period is increased due to the letter-box picture conversion. This means that the decoding waiting period is increased in the prior art, and the effect of the present invention which needs no decoding waiting period is further remarkable.

With respect to the memory division, in both of the NTSC system and the PAL system, each of the two reference frame areas has the capacity of full frame size, and the capacity of the B picture area is equal to ¾ of the value obtained by adding the full frame size to the amount corresponding to the number of blocks which are decoded within the decoding waiting period containing the non-display period of FIG. 7. Further, in both the NTSC and PAL systems, the OSD data area and the audio data area are ensured.

Figure 10A:
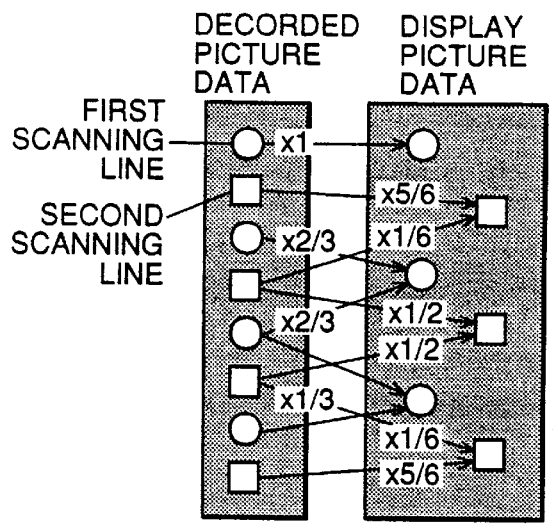
FIGS. 10A and 10B are diagrams showing the principle of letter-box conversion.
Figure 10B:
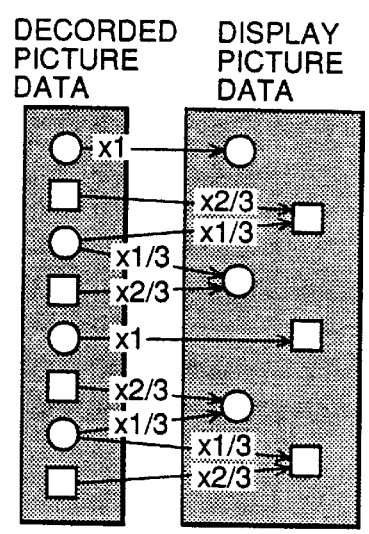

FIGS. 10A and 10B are diagrams showing the principle of the scan line conversion for the letter-box picture conversion. The calculation between the scan lines in each field is performed every eight scan lines to convert the eight scan lines to six scan lines. With this calculation, the number of scan lines of one picture is changed from 480 to 360 in the NTSC system, and from 576 to 432 in the PAL system, whereby a picture having an aspect ratio of 16:9 can be displayed at the center portion of the monitor of 4:3 aspect ratio while keeping the aspect ratio of 16:9.

FIG. 10A represents calculations for an interlaced picture, and FIG. 10B represent calculations for a non-interlaced (progressive) picture. The selection of a set of calculations shown in FIGS. 10A and 10B is determined in accordance with a coded parameter in the coded picture data.

FIG. 11 shows the decoded data write-in control circuit 9 of this embodiment. In FIG. 11, reference numeral 91 represents a scan line conversion circuit, reference numeral 92 represents a selector, reference numeral 93 represents a memory write-in control circuit, and reference numeral 94 represents a logical product circuit. The decoded data are input to one of the scan line conversion circuit 91 and the selector 92. The selector 92 transmits the output data of the scan line conversion circuit 91 as decoded data to the memory write-in control circuit 93 in the case where the letter-box conversion is performed and the data are limited to the decoded data of the B picture, and it directly transfers input data as decoded data to the memory write-in control circuit 93 in the other cases, thereby performing the write-in operation into the memory 11. Accordingly, with respect to the B picture, the decoded data are subjected to the letter-box picture conversion, and then stored in the memory 11. On the other hand, with respect to the I and P pictures which are required to be used as reference data in the motion compensation circuit 4, the decoded data are directly stored in the reference picture area of the memory 11. The size of the B picture which is subjected to the letter-box picture conversion is equal to ¾ of the full picture size, whereby the size of the B picture area of the memory 11 is reduced. This can offset the increase of the memory corresponding to the decoding waiting period, and ensure the area for the OSD and the audio data in the memory 11. Further, the decoded data to be written in the memory 11 are reduced, whereby the speed of the write-in operation into the memory 11 can be reduced by the reduction of the decoded data.

Figure 12:
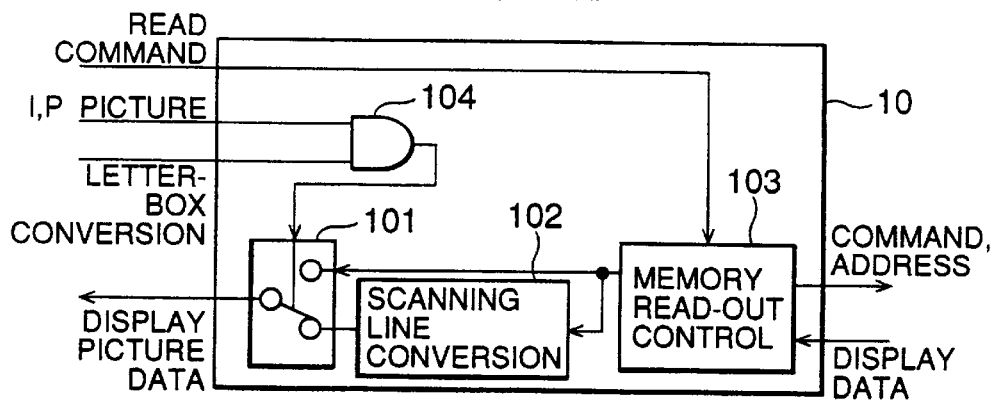
FIG. 12 is a diagram showing an example of a display data read-out control circuit which can be subjected to letter-box conversion.
Figure 13:
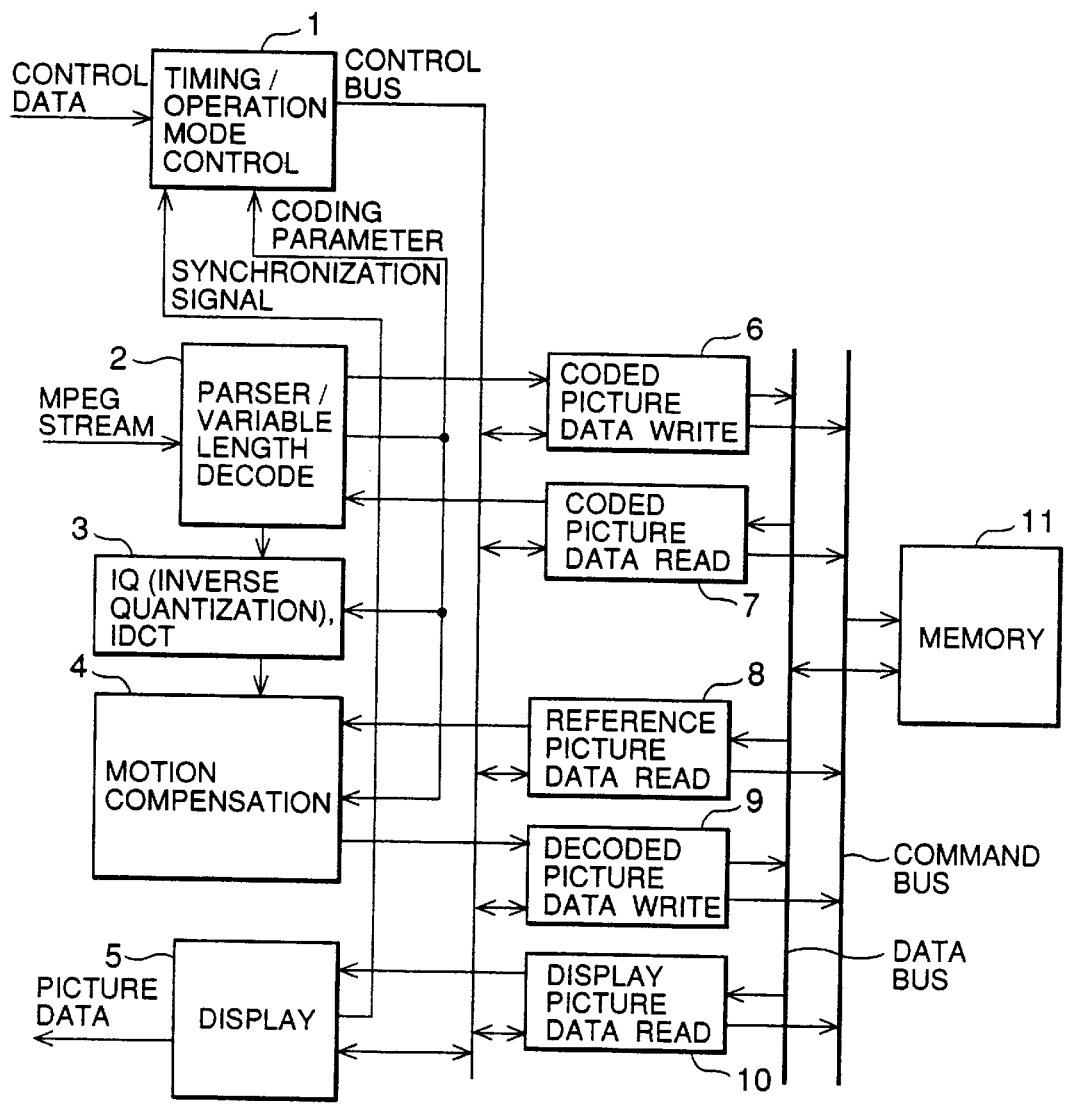
FIG. 13 is a diagram showing a conventional decoding/displaying device of coded picture data.

The letter-box conversion of the I and P picture is performed in the display data read-out circuit 10 shown in FIG. 12. In FIG. 12, reference numeral 101 represents a selector, reference numeral 102 represents a scan line conversion circuit, reference numeral 103 represents a memory data read-out circuit, and reference numeral 104 represents a logical product circuit. In the memory data read-out circuit 103, the display data read out from the memory 11 are input to one of the scan line conversion circuit 102 and the selector 101. The selector 101 outputs the output data of the scan line conversion circuit 91 as display data in the case where the letter-box conversion is performed and the data are limited to the display data of the I and P pictures, and also directly outputs the input data as display data in the other cases. As a result, the letter-box conversion is performed on all the picture types in combination with the decoded data write-in control circuit 9 of FIG. 11.

Figures 8, 9:
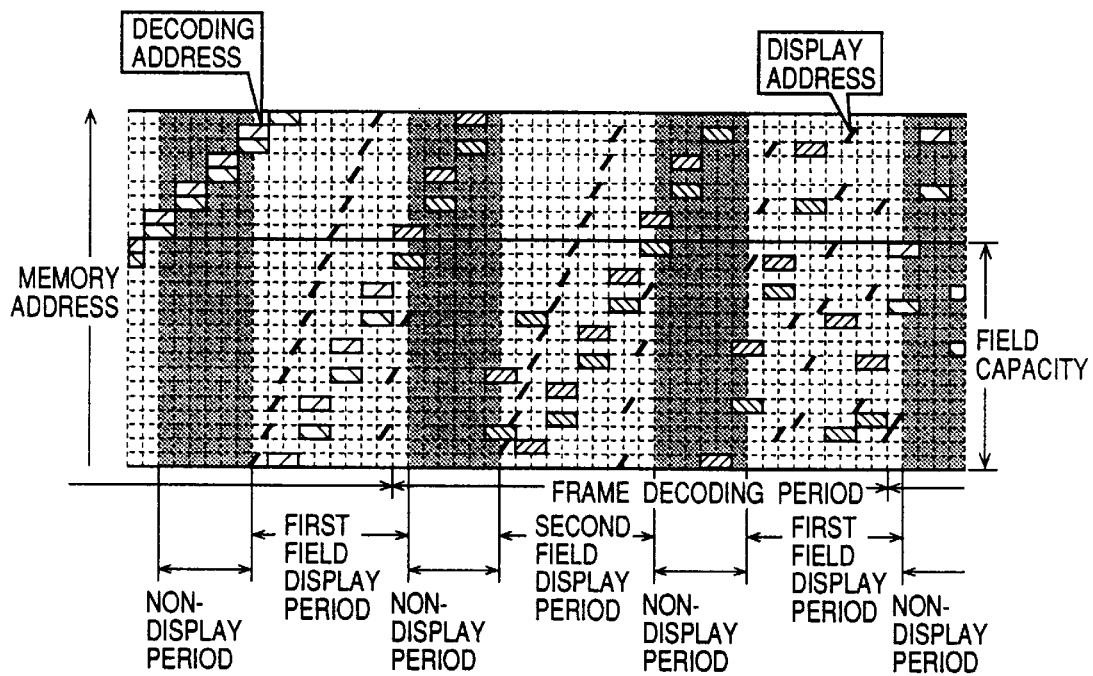
FIG. 8 is a diagram showing the memory area division of a fourth embodiment.
FIG. 9 is a diagram showing the memory control of the B picture area of the fourth embodiment.

A fourth embodiment according to the present invention will be described with reference to FIGS. 8 and 9. FIG. 8 shows the memory area division in the PAL system when the letter-box picture conversion is performed. However, this is also applicable to the NTSC system. FIG. 9 shows the memory control system for the B picture when the letter-box picture conversion is performed. When no letter-box conversion is performed, the second embodiment is applied. The principle of the operation is similar to that of the second embodiment, but the enlargement of the memory area in consideration of the non-display period which is increased to perform the letter-box picture conversion, and the reduction of the memory area in consideration of the data amount which is reduced to perform the letter-box picture conversion are considered at the same time, and the size of the B picture area can be set to 323 Kbytes. Therefore, the OSD data area can be more greatly enlarged compared with the third embodiment.

In the first to fourth embodiments described above, the decoding waiting period is eliminated by increasing the frame memory area by the amount corresponding to the decoding waiting period of picture data in the sense of the prior art. However, in place of the above embodiments, the following fifth to eighth embodiments may be used. In the fifth to eighth embodiments, the frame memory area is divided into plural memory units and the memory units are rearranged to enable selection of plural kinds of memory maps without increasing the frame memory capacity, and there is further provided memory map switching means for switching the memory map to be applied to each frame memory according to a predetermined rule every time decoded picture data stored in the frame memory are updated, thereby eliminating the decoding waiting period. However, in the following description, only the elimination of the decoding waiting period will be described, as in the case of the first to fourth embodiments, it is needless to say that the functions of the display of the OSD data, the decoding of the audio data and the letter-box picture conversion can be implemented by commonly using one memory means.

Figure 18:
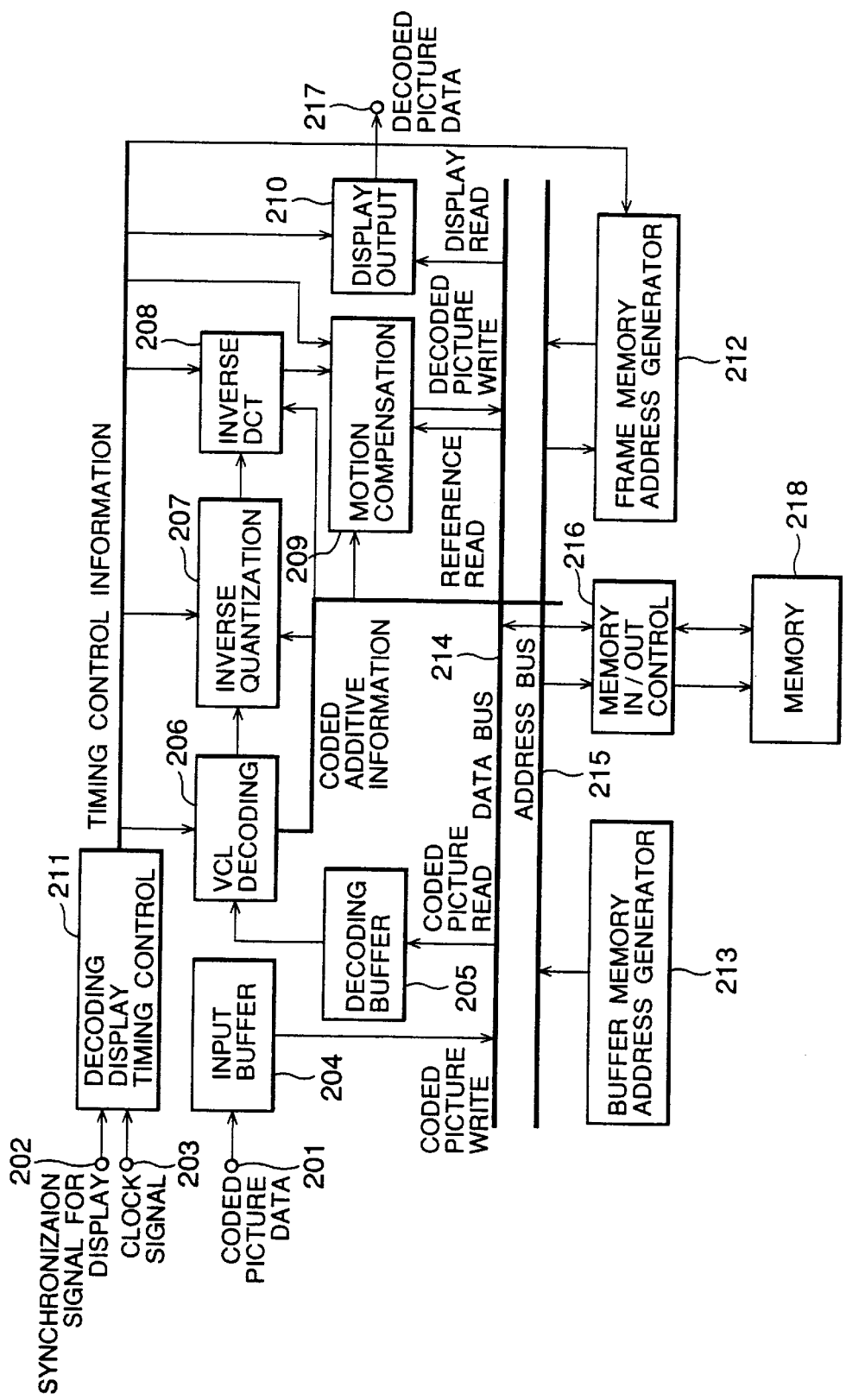
FIG. 18 is a diagram in which the decoding/displaying device of the coded picture data shown in FIG. 1 is re-drawn.

FIG. 18 shows the redrawn construction of the decoding/displaying device for the coded picture data in FIG. 1. In FIG. 18, reference numeral 201 represents an input terminal for coded picture data, reference numeral 202 represents an input terminal for a synchronization signal for display, reference numeral 203 represents an input terminal for a clock signal (not shown in FIG. 1), reference numeral 204 represents an input buffer, reference numeral 205 represents a decoding buffer, reference numeral 206 represents a VLC (Variable Length Code) decoding circuit, reference numeral 207 represents an inverse quantization circuit, reference numeral 208 represents an inverse DCT (Discrete Cosine Transformation) circuit, reference numeral 209 represents a motion compensation circuit, reference numeral 210 represents a display output circuit, reference numeral 211 represents a decoding displaying timing control circuit, reference numeral 212 represents a frame memory address generator, reference numeral 213 represents a buffer memory address generator, reference numeral 214 represents a data bus, reference numeral 215 represents an address bus, reference numeral 216 represents a memory input/output control circuit, reference numeral 217 represents an output terminal for picture data, and reference numeral 218 represents a memory. In the corresponding relationship between FIG. 18 and FIG. 1, the input buffer 204, the decoding buffer 205 and the VLC decoding circuit 206 correspond to the parser/variable-length decoding circuit 2 of FIG. 1, the inverse quantization circuit 207 and the inverse DCT circuit 208 correspond to the inverse quantization IDCT circuit 3 of FIG. 1, the motion compensation circuit 209 corresponds to the motion compensation circuit 4 of FIG. 1, and the display output circuit 210 corresponds to the display circuit 5 of FIG. 1. Further, the buffer memory address generator 213 corresponds to the picture data write-in circuit 6 and the picture data read-out circuit 7 of FIG. 1, the frame memory address generator 212 corresponds to the reference data readout circuit 8, the decoded data write-in circuit 9 and the display data read-out circuit 10, and the memory input/output control circuit 216 and the memory 218 correspond to the memory 11 of FIG. 1.

Figure 19:
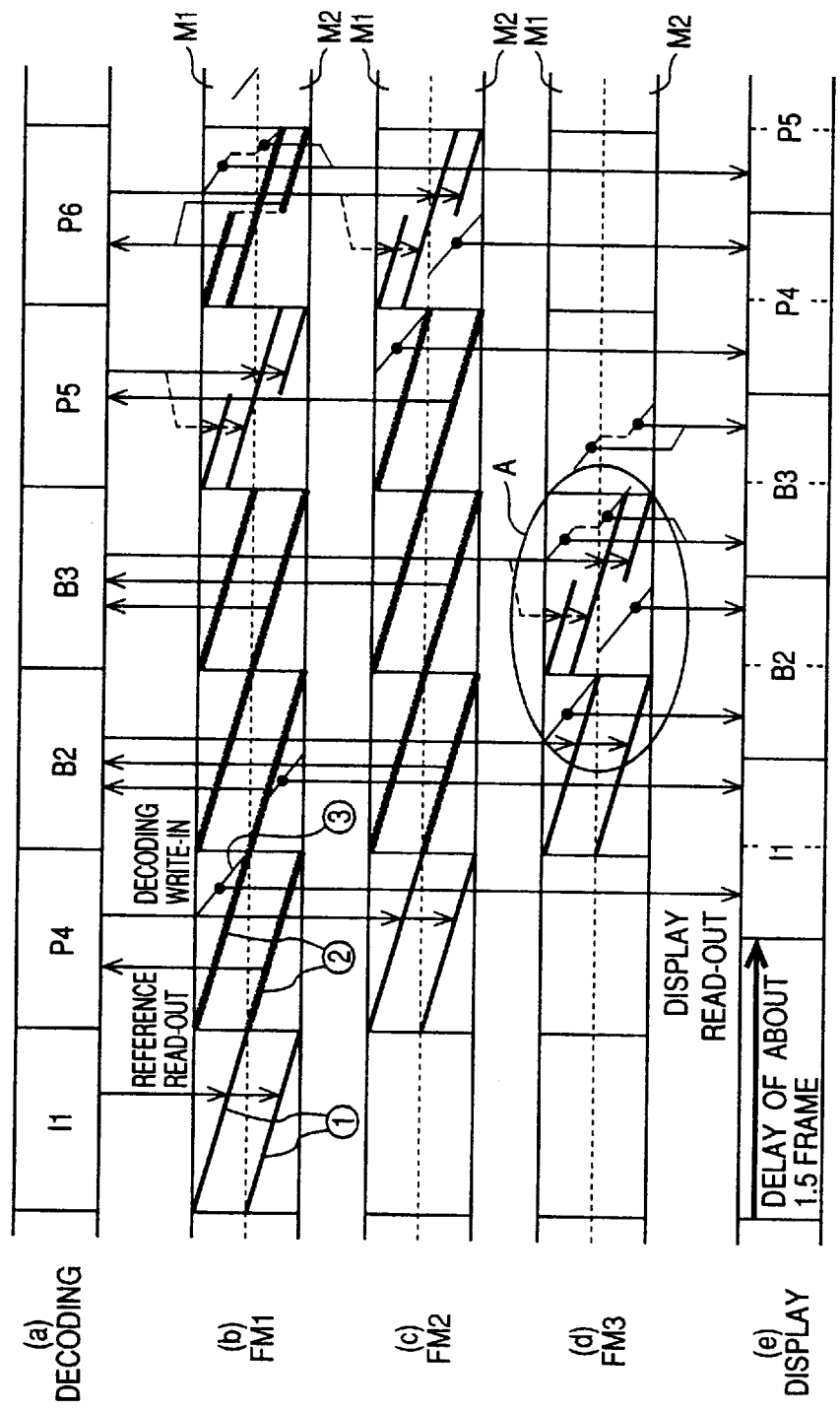
FIG. 19 is a timing chart showing the flow of the decoding and displaying processing of a fifth embodiment.

FIG. 19 shows a fifth embodiment according to the present invention, and shows the flow and timing of the decoding and displaying processing. Like FIG. 17, (a) of FIG. 19 shows the frame order of coded picture data to be decoded, (e) of FIG. 19 shows the frame order of decoded picture data to be displayed, and (b), (c) and (d) of FIG. 19 show the memory images of frame memories FM1 to FM3 on three faces of the memory 18. Each of the frame memories FM1 to FM3 is illustrated as being divided into the memory images of two field memories M1 and M2 at the upper and lower sides. Further, the reference numerals ① to ③ in (b), (c) and (d) of FIG. 19 are the same as those of FIG. 17. FIG. 19 shows an irregular arrangement pattern in which no B frame exists between P4 and P5 frames like FIG. 17.

In FIG. 19, the decoding processing method of each frame of I, P, B is similar to the method which is described with reference to FIG. 17, but the method of write-in and read-out of decoded frames into and from the memory 18 is different from the method of FIG. 17. That is, with respect to the frame memory FM1 shown in (b) of FIG. 19, in the decoding writing operation of the decoded I1 frame, the decoded picture data of the first and second fields of the decoded I1 frame are written simultaneously and in parallel into the different field memories M1 and M2 as in the case of FIG. 17. On the other hand, in the decoding writing operation of a next P5 frame, the decoded picture data of the first half of first and second fields are first written simultaneously and in parallel into the field memory M1, and then the decoded picture data of the last half of first and second fields are written simultaneously and in parallel into the field memory M2.

Likewise, with respect to the frame memory FM2 shown in (c) of FIG. 19, the same decoding writing operation as the I1 frame is performed for the decoded P4 frame. For the next P6 frame, the decoding and writing operation is performed by the same method as the write-in operation of the P5 frame into the frame memory FM1.

Likewise, with respect to the frame memory FM3 shown in (d) of FIG. 19, the same decoding writing operation as the I1, P4 frames is performed on the decoded B2 frame. For the next B3 frame, the decoding writing operation is performed by the same method as the decoding writing operation of the P5, P6 frames into the frame memories FM1, FM2.

As described above, according to the fifth embodiment, one of the following methods is selected every frame memory FM1, FM2, FM3: a method for writing the decoded picture data of the different fields into the respective field memories M1 and M2 simultaneously and in parallel (this method is referred to as the "first decoding writing method") like the decoding and writing operation of the I1 frame, the P4 frame and the B2 frame; and a method for writing the decoded picture data of the first half portions of the first and second fields into the field memory M1 simultaneously and in parallel, and then writing the decoded picture data of the last half portions of the first and second fields into the field memory M2 simultaneously and in parallel (this method is referred to as the "second decoding writing method") like the decoding and writing operation of the P5 frame, the P6 frame and the B3 frame. These first and second decoding writing methods are alternately used every time the decoding and writing operation is performed.

Accordingly, in (d) of FIG. 19, the decoding and writing operation of the B frames is performed in the order of B2 and B3, for example. However, for a B frame group which starts the B2 frame and contains every other B frames, the decoding and writing operation is performed by the first decoding writing method, and for a B frame group which starts the B3 frame and contains every other B frame, the decoding and writing operation is performed by the second decoding writing method.

As described above, according to the fifth embodiment, the two different decoding writing methods are used, and thus two kinds of memory maps are set for each frame memory FM1, FM2, FM3. These memory maps are alternately switched from one to the other every time the frame data held in the frame memory FM1, FM2, FM3 are updated (i.e., every time the decoding and writing operation is newly performed).

Figure 20:
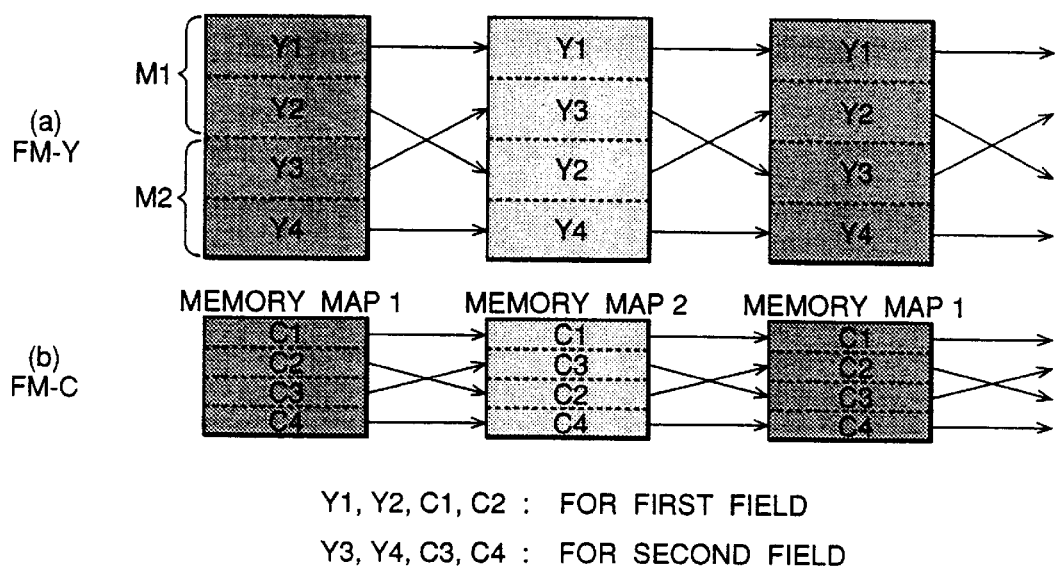
FIG. 20 is a diagram showing a switching operation of a frame memory map of the fifth embodiment.

FIG. 20 is a diagram showing the switching operation of the memory map of each frame memory FM1, FM2, FM3 in the memory 218 in FIG. 18. (a) of FIG. 20 represents a frame memory area FM-Y for brightness data Y, and (b) of FIG. 20 represents a frame memory area FM-C for color difference data.

Here, the frame memory areas FM-Y and FM-C are similar to each other, and thus the frame memory area FM-Y will be representatively described with reference to (a) of FIG. 20. The frame memory area FM-Y is divided into memory units Y1, Y2, Y3, Y4, having an equal storage capacity. Each of these memory units Y1, Y2, Y3, Y4 has a storage capacity corresponding to a half field. In the arrangement order of FIG. (a) of FIG. 20, the first two memory units form the field memory M1 in FIG. 19, and the last two memory units form the field memory M2 in FIG. 19.

In the case of the memory map 1, the first memory unit Y1 and the second memory unit Y2 are allocated to the picture data of the first field in the arrangement order forming the field memory M1, the third memory unit Y3 and the fourth memory unit y4 forming the field memory M2 are allocated to the picture data of the second field. The memory map 1 is applied to the first decoding writing method like the decoding and writing operation of the I1 frame in FIG. 17, for example.

Accordingly, in the case of the first decoding writing method (for example, the decoding and writing operation of the I1 frame), the memory map 1 is selected, and the first field and the second field of the decoded frame are simultaneously written into the memory units Y1, Y2, and into the memory units Y3, Y4.

On the other hand, in the case of the memory map 2, the memory unit Y1 which is arranged in the first half of the field memory M1 and the memory unit Y2 which is arranged at the first half of the field memory M2 are allocated to the picture data of the first field, and the memory unit Y3 arranged at the second half of the field memory M1 and the memory unit Y4 arranged at the second half of the field memory M2 are allocated to the picture data of the second field.

Accordingly, in the case of the second decoding writing method (for example, the decoding and writing operation of the P5 frame), the memory map 2 is selected, and the first half portions of the first and second fields of the decoded frame are simultaneously written into the memory units Y1 and Y3 respectively, and then the last half portions of the first and second fields are simultaneously written into the memory units Y2 and Y4 respectively.

As described above, in each of the frame memories FM1, FM2, FM3, the first and second decoding and writing methods are alternately selected every time the decoding and writing operation is newly performed.

Figure 22:
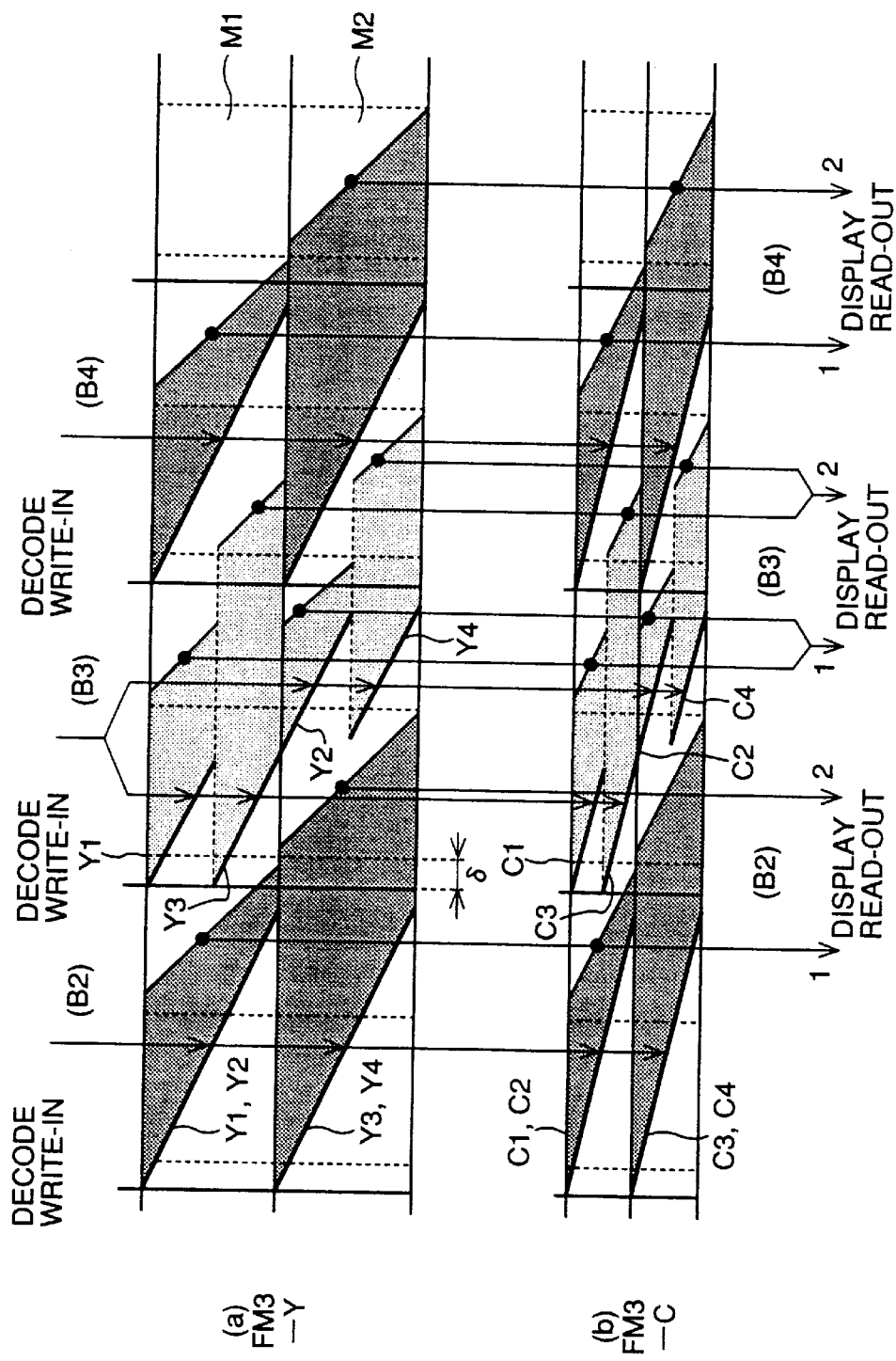
FIG. 22 is a diagram showing the memory control of the B picture frame memory of the fifth embodiment.

FIG. 22 shows the relationship between the decoding writing operation and the display read-out operation in the B frame (FM3). In the following description, for the sake of convenience, it is shown that three continuous B frames are subjected to the decoding and displaying processing unlike the case of FIG. 19, and the memory image of the frame memory FM3 for the B frame is illustrated as being divided into a frame memory area FM3-Y for brightness data Y and a frame memory area FM3-C for color difference data.

In the B2 and B4 frames to which the memory map 1 is applied, the time transition of an address area which is occupied by the frame memory FM3 is shown as being densely crosshatched in correspondence to the memory map 1 in FIG. 20. In the frame B3 to which the memory map 2 is applied, the time transition of the address area which is occupied by the frame memory FM3 is illustrated as being lightly crosshatched in correspondence to the memory map 2 in FIG. 20.

In this embodiment, in addition to one field period, a predetermined time lag δ is provided between the decoding period of the coded picture data of each frame and the display period of the decoded picture data so that the densely crosshatched portion and the lightly crosshatched portion are not overlapped with each other. Therefore, it is not necessary to provide the decoding waiting period which exists in the prior art shown in FIG. 17.

That is, the decoding of the coded picture data of each frame is performed for one frame period containing the vertical blanking period. In the prior art shown in FIG. 17, since it is necessary to provide the vertical blanking for the display of the decoded picture data, a predetermined period containing the vertical blanking period is set and the decoding processing is stopped with the predetermined period being set as the decoding waiting period (5) (FIG. 17). Therefore, it is necessary to set the decoding period to be shorter than one frame period, thereby enhancing the decoding processing capability. However, in this embodiment, the decoding period is set to be equal to one frame period in no consideration of the vertical blanking period so that the decoding processing capability is optimized.

In this case, like the B frame in (d) of FIG. 19, when the display read-out operation is only performed together with the decoding writing operation, the timing of the display read-out must be set so that when the decoding writing operation in the memory is finished, the display read-out operation in the memory is finished. Therefore, representing the time lag between the end time point of the decoding period of each frame and the center time point of the display period (at the switch point between the first and second fields) by $\delta$, the delay time from the decoding until the display corresponds to the sum of the 0.5 frame period as in the prior art and the time lag $\delta$, that is, (0.5 frame+$\delta$) period in the B frames (B2, B3 frames).

The time lag $\delta$ should also be set between the decoding period and the display period of another frame (I, P frame), and thus the delay time from the decoding until the display of the I frame at the head of the coded picture data shown in (a) and (e) of FIG. 19 is equal to the sum of the 1.5 frame period as in the prior art and the time lag $\delta$, that is, (1.5 frame+$\delta$) period.

Figure 17:
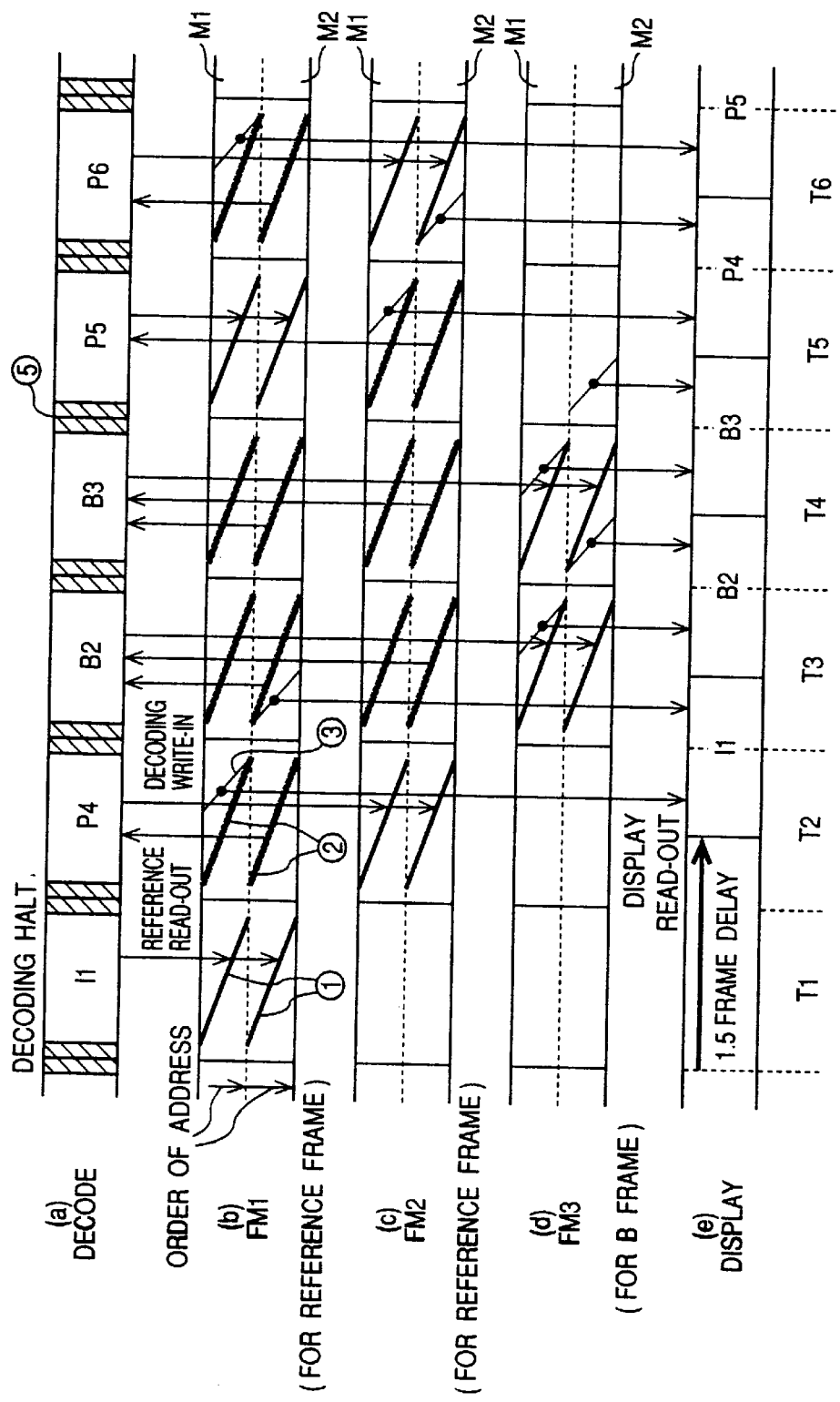
FIG. 17 is a timing chart showing the flow of the decoding and displaying processing of the prior art.

Comparing between FIGS. 17 and 19, in the embodiment shown in FIG. 19, when the decoding period is fully extended to the frame period, it is equivalent to the delay of the display read-out by the extension amount $\delta$.

In a decoding/displaying processing of B2 and B3 frames using FM3 for B frame shown in FIG. 17, in the case where the decoding writing is fully extended to the frame period, even when the display read-out of frame B2 is delayed in accordance with the extension, a disadvantage occurs at the field memory M2 in FM3 that the start timing of the decoding writing of frame B3 is prior to the display readout of frame B2. On the other hand, in this embodiment, even when the decoding writing is fully extended to the frame period, the decoding writing is not overlapped with the display read-out as shown in an A portion in FIG. 19.

As described above, in this embodiment, the decoding period of the coded picture data of each frame can be extended to one frame period by switching the memory map in the frame memory FM1, FM2, FM3 and the decoding writing method, and it is unnecessary to provide the extra decoding waiting period containing the vertical blanking period, so that the decoding processing capability can be optimized.

The time lag $\delta$ is set to an intermediate value between a permissible time lag range in which in the second memory unit of the frame memory area FM3-Y (in FIG. 20, the memory unit Y2 in the case of the memory map 1, and the memory unit Y3 in the case of the memory map 2), the display read-out of the B2 frame is subsequent to the decoding writing of the B2 frame based on the memory map 1, and the decoding writing of the B3 frame based on the memory map 2 is subsequent to the display read-out of the B2 frame. When the decoding displaying processing corresponding to the NTSC system is performed, the permissible time lag range is set to have a width of about a 100-line period. When the decoding displaying processing corresponds to the PAL system, the permissible time lag range is set to have a width of about a 120-line period.

Figure 23:
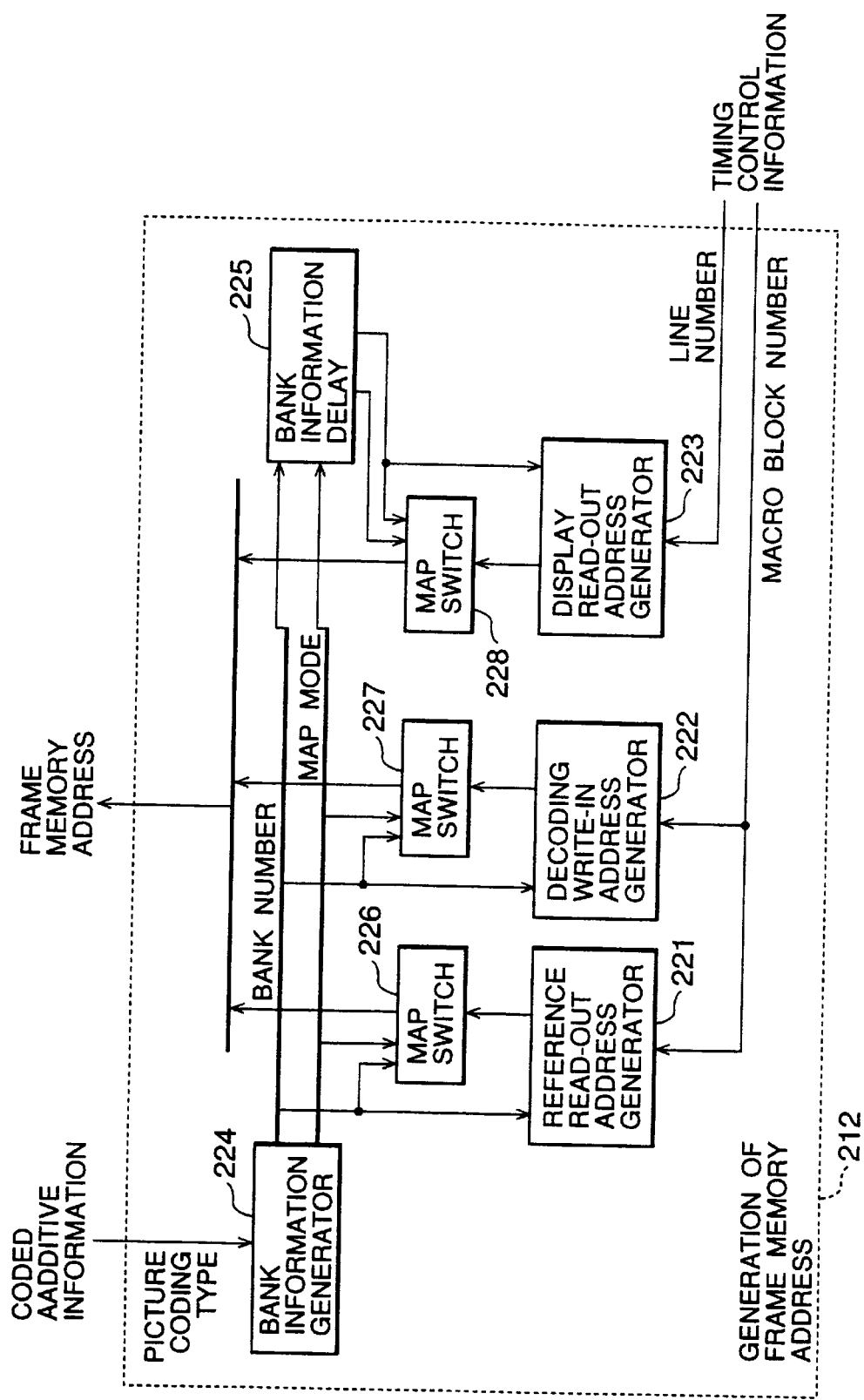
FIG. 23 is a diagram showing the frame memory address generator of the fifth embodiment.

FIG. 23 is a block diagram showing an embodiment of the frame memory address generator 212. In FIG. 23, reference numeral 221 represents a reference read-out address generator, reference numeral 222 represents a decoding writing address generator, reference numeral 223 represents a display read-out address generator, reference numeral 224 represents a bank information generator, reference numeral 225 represents a bank information delay circuit, and reference numerals 226 to 228 represent map switching circuits.

In FIG. 23, the frame memory address generator 212 generates address signals for three kinds of memory accesses (i.e., the reference read-out, decoding writing and display read-out) to the frame memory 218 (see FIG. 18).

As previously described with reference to FIG. 19, the reference read-out ② is to read out prediction data from the frame memories FM1, FM2 for reference frames when P and B frames which are subjected to the motion compensated interframe prediction coding are decoded. The decoding writing ① is to write the decoded picture data into the frame memories FM1 to FM3. The display read-out ③ is to successively read out the picture data decoded from the frame memories FM1 to FM3 according to the display scan.

In FIG. 23, the reference read-out address generator 221 generates a read-out address signal for the memory access of the reference read-out operation, the decoding write-in address generator 222 generates a write-in address signal for the memory access of the decoding and writing operation, and the display read-out address generator 223 generates a read-out address signal for the memory access of the display read-out operation. The reference read-out address generator 221 and the decoding write-in address generator 222 are supplied with a macro block number representing the macro block being decoded as timing control information from the decoding displaying timing control circuit 211 (see FIG. 18). The macro block number contains Y/C identifying information for discriminating the brightness data Y and the color difference data C.

The reference read-out address generator 221 is supplied with a bank number for the reference read-out operation to select any one of the frame memories FM1 to FM3 of three faces (see FIG. 19) from the bank information generator 224. One kind of bank number representing any one of the frame memories FM1, FM2 as a read-out destination is supplied to the non-intra macro block which is subjected to the one-direction motion compensated interframe predictive coding of the P frame to generate the read-out address signal for the reference read-out operation, and predictive data are read out from one reference frame. Two kinds of bank numbers representing the frame memories FM1 and FM2 as read-out destinations are simultaneously supplied to the non-intra macro block which are subjected to the bi-directional motion compensated interframe predictive coding of the B-frame to generate the read-out address for the reference read-out operation, and predictive data are read out from two reference frames of the frame memories FM1 and FM2.

Further, the decoding write-in address generator 222 is also supplied with the bank number for the decoding and writing operation to select any one of the three frame memories FM1 to FM3 as a write-in destination from the bank information generator 224. The display read-out address generator 223 is supplied with the line number to be displayed in accordance with the display timing as timing control information from the decoding displaying timing control circuit 211 (see FIG. 18). The line number contains information for discriminating the first field and the second field of the same frame from each other. Further, the bank number for the display read-out operation to select any one of the three frame memories FM1 to FM3 as a read-out destination is generated in the bank information generator 224 according to the decoding timing, and delayed by the bank information delay circuit 225 and then supplied to the display read-out address generator 223. The delay in the bank information delay circuit 225 is performed to synchronize the supply timing of the bank number for the display read-out operation with the display timing.

The bank information generator 224 generates the bank number for the reference read-out operation, the decoding and write-in operation or the display read-out operation every frame in accordance with the picture coding type (I, P or B frame) of the frame to be decoded. The picture coding type is indicated by coding additive information which is separated from the coding picture data in the VLC decoding circuit 206 (FIG. 18). When the picture coding type is any one of the I or P frames, the bank number for the decoding and writing operation indicates any one of the frame memories FM1 and FM2. When the frame memory FM1 is selected in the decoding and writing operation of the immediately preceding I frame or P frame, the bank information generator 224 selects the other frame memory FM2. Conversely, when the frame memory FM2 is selected in the decoding and writing operation of the immediately preceding I frame or P frame, the frame memory FM1 is selected. When the picture coded type is the B frame, the bank number for the decoding and writing operation indicates the frame memory FM3.

The bank number for the reference read-out operation indicates the frame memory FM1 or FM2 which is not selected for the decoding and writing operation in the case of the reference read-out operation of the P frame, and in the case of the reference read-out operation of the B frame, the bank number corresponds to two types of numbers indicating both the frame memories FM1 and FM2.

In the case of the display read-out of the I and P frames, the display read-out bank number indicates the frame memory FM1 or FM2 which is not selected for the decoding and writing operation, and in the case of the display read-out of the B frame, it indicates the frame memory FM3.

Since the decoding operation is performed on a macro block basis according to a fixed time slot, the three types of memory accesses (i.e., the decoding/writing, reference read-out, display read-out) to the frame memories FM1 to FM3 in the memory 218 (FIG. 18) are performed at a fixed timing. The address signals for the reference read-out operation, the decoding and writing operation and the display read-out operation which are performed in time-division mode are generated in the reference read-out address generator 221, the decoding and write-in address generator 222 and the display read-out address generator 223 at the respective allocation timing. For these address signals, the logical address corresponding to the memory map 1 shown in FIG. 20 is first generated, the switching operation between the memory map 1 and the memory map 2 and the conversion to the physical address are performed in the map switching circuits 226, 227 or 228, and then the signal is output to the address bus 215 as a frame memory address signal which is time-division multiplexed.

The map switching circuits 226, 227 and 228 have basically the same operation. These map switching circuits are supplied with a map mode indicating whether the frame memory FM1, FM2 or FM3 corresponding to the bank number is in the map memory 1 state or in the map memory 2 state, and the switching operation between the memory map 1 and the memory map 2 is performed as shown in FIG. 20. Further, an offset value serving as a base address of the addresses of the frame memory FM1, FM2 or FM3 is altered in accordance with the bank number.

The map switching circuits 226 and 227 are supplied with a map mode from the bank information generator 224, and the map switching circuit 228 is supplied with a map mode which is generated in the bank information generator 224 and then delayed by the bank information delay circuit 225.

The delay is made to enable synchronization with the display timing like the display read-out bank number. Simultaneously with the output of the bank number, the bank information generator 224 outputs the corresponding map mode while managing the map mode of each frame memory FM1 to FM3. It stores the map modes of the frame memories FM1 to FM3 and switches the map mode corresponding to the frame memory FM1 to FM3 which performs the decoding and writing operation every frame.

In the MPEG-2 system, there is known not only such a frame structure that the coding is performed on a frame basis, but also such a field structure that one frame comprises two fields and the coding is performed on a field basis. There is also known such a case that the switching between the frame structure and the field structure is performed every frame and thus the coded picture data of the frame structure and the field structure coexist with each other. The technical idea of the fifth embodiment is applicable to such a coded picture stream. The memory 218 comprises three frame memories FM1, FM2, FM3 and a buffer memory, and each of these frame memories FM1 to FM3 is divided into four memory units as in the case of FIG. 20. However, the switching method of the memory maps may be slightly varied. That is, in this case, after the frame structure and the field structure for the coding are discriminated from each other, when the decoded picture data obtained by decoding the coded picture data of the frame structure are written into the frame memories FM1 to FM3, the memory map of the frame memory to be written is switched, and when the decoded picture data obtained by decoding the coded picture data of the field structure are written into the frame memories FM1 to FM3, the memory of the frame memory to be written is not switched. With respect to the frame which is coded in the field structure, it is not necessary to switch the memory map because the shift speed of the read-out address of the display read-out operation and the shift speed of the write-in address of the decoding and writing operation are set to be substantially equal to each other.

Next, a sixth embodiment according to the present invention will be described hereunder.

Figure 24:
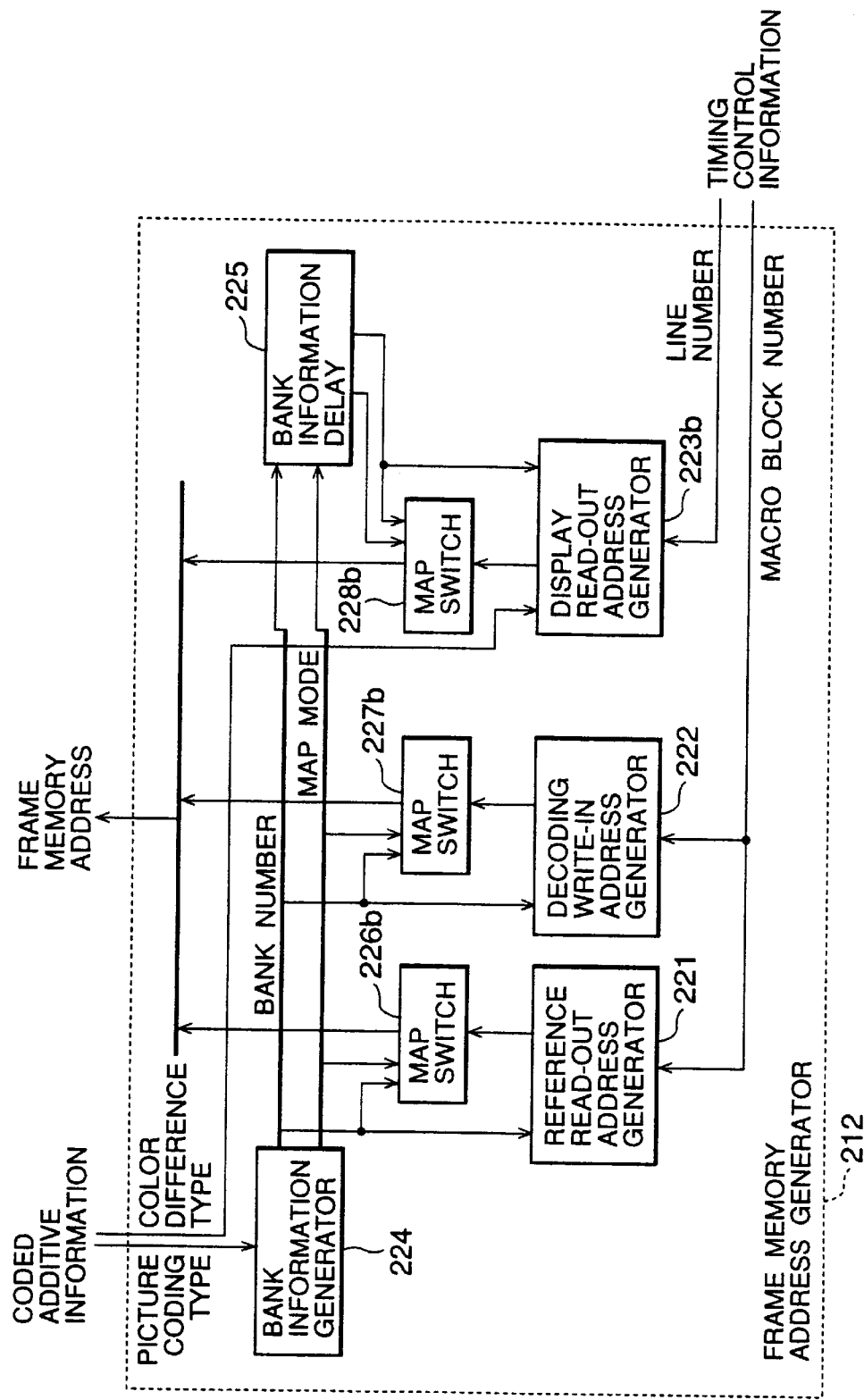
FIG. 24 is a diagram showing the frame memory address generator of a sixth embodiment.

In the MPEG-2 system, when the coding is performed in a format of 4:2:0, two methods are switchable as a format conversion method from 4:2:2 format. In normal picture signals which are scanned in an interlace mode, the line number of two kinds of color difference signals is reduced to a half on a field basis. However, for example, in picture signals which are originally produced in a progressive scan mode from a film source, the line number of the two kinds of color difference signals is reduced to a half on a frame basis. The two kinds of color difference types of the field format and the frame format can be switched on a frame basis. The sixth embodiment corresponds to this situation. The construction of the sixth embodiment is the same as FIG. 18. FIG. 24 shows the construction of the frame memory address generator 212 in FIG. 18.

FIG. 24 is a block diagram showing an embodiment of the frame memory address generator 212 of FIG. 18 in the sixth embodiment. Reference numeral 223*b* represents a display read-out address generator, and reference numerals 226*b* to 228*b* represent map switching circuits. The portions corresponding to those of FIG. 23 are represented by same reference numerals, and the duplicated description thereof is omitted. The difference from the frame memory address generator 212 of the embodiment shown in FIG. 23 resides in the fact that not only the information on the picture coding type, but also the information on the color difference type are supplied as coding additive information to be supplied from the VLC decoding circuit 206 (FIG. 18). The color difference type information indicates whether the color difference type of the frame to be coded is the frame format or the field format.

Figure 21:
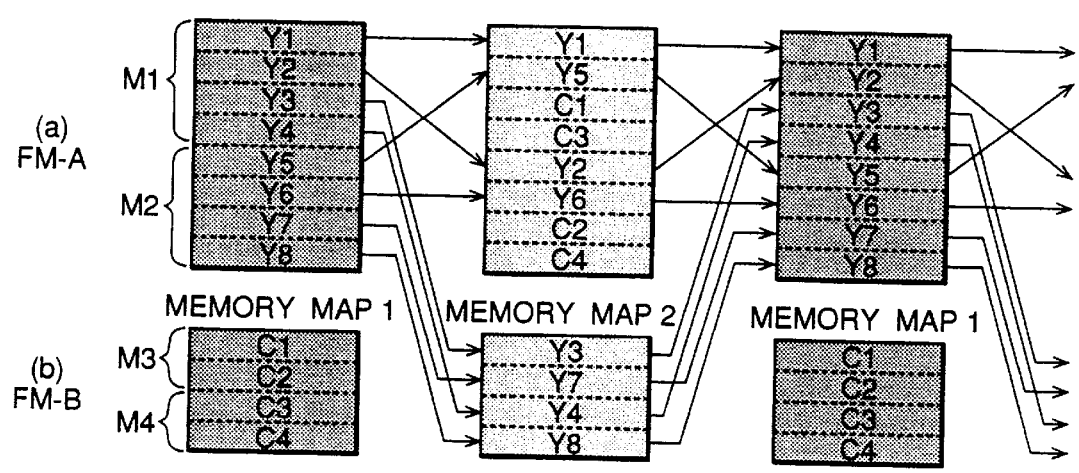
FIG. 21 is a diagram showing the switching operation of a frame memory map of a sixth embodiment.
Figure 25:
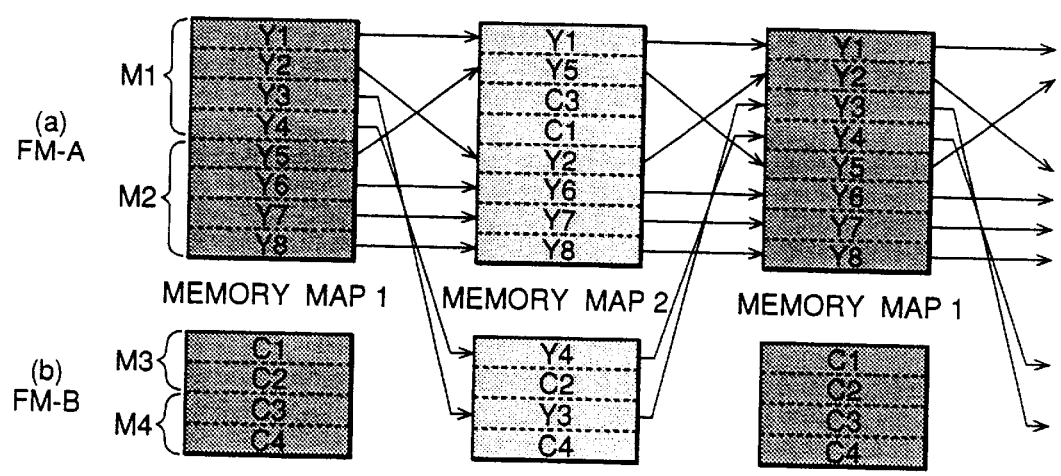
FIG. 25 is a diagram showing the switching operation of the frame memory map of the sixth embodiment.

The display read-out address generator 223b is supplied with the color difference type information, and the address signal generating method of the logical address corresponding to the memory map 1 shown in FIG. 25 or 21 for the color difference data C is switched on the basis of whether the color difference type is the frame format or the field format.

FIG. 25 shows the switching operation of the memory maps of the frame memories FM1 to FM3 in the memory 218 of FIG. 18 in the sixth embodiment. In the sixth embodiment, as in the case of the fifth embodiment, two types of memory maps are set. As shown in FIG. 25, frame memory areas FM-A, FM-B corresponding to combinations of the frame memory area FM-Y for brightness data Y and the frame memory area FM-C for color difference data C are provided as each frame memory FM1, FM2, FM3 as shown in FIG. 25. The frame memory area FM-A is divided into eight memory units, and the frame memory area FM-B is divided into four memory units, whereby a total of twelve memory units having the same size are set.

In the sixth embodiment, the four memory units of the first half portion of the frame memory area FM-A in the arrangement order form the field memory M1, and the other four memory units of the last half portion of the frame memory area FM-A form the field memory M2. Likewise, the two memory units of the first half portion of the frame memory area FM-B in the arrangement order form the field memory M3, and the other two memory units of the last half portion of the frame memory area FM-B in the arrangement order form the field memory M4. However, each of these field memories M3 and M4 has a storage capacity of only a half field for the brightness data Y.

Figure 26:
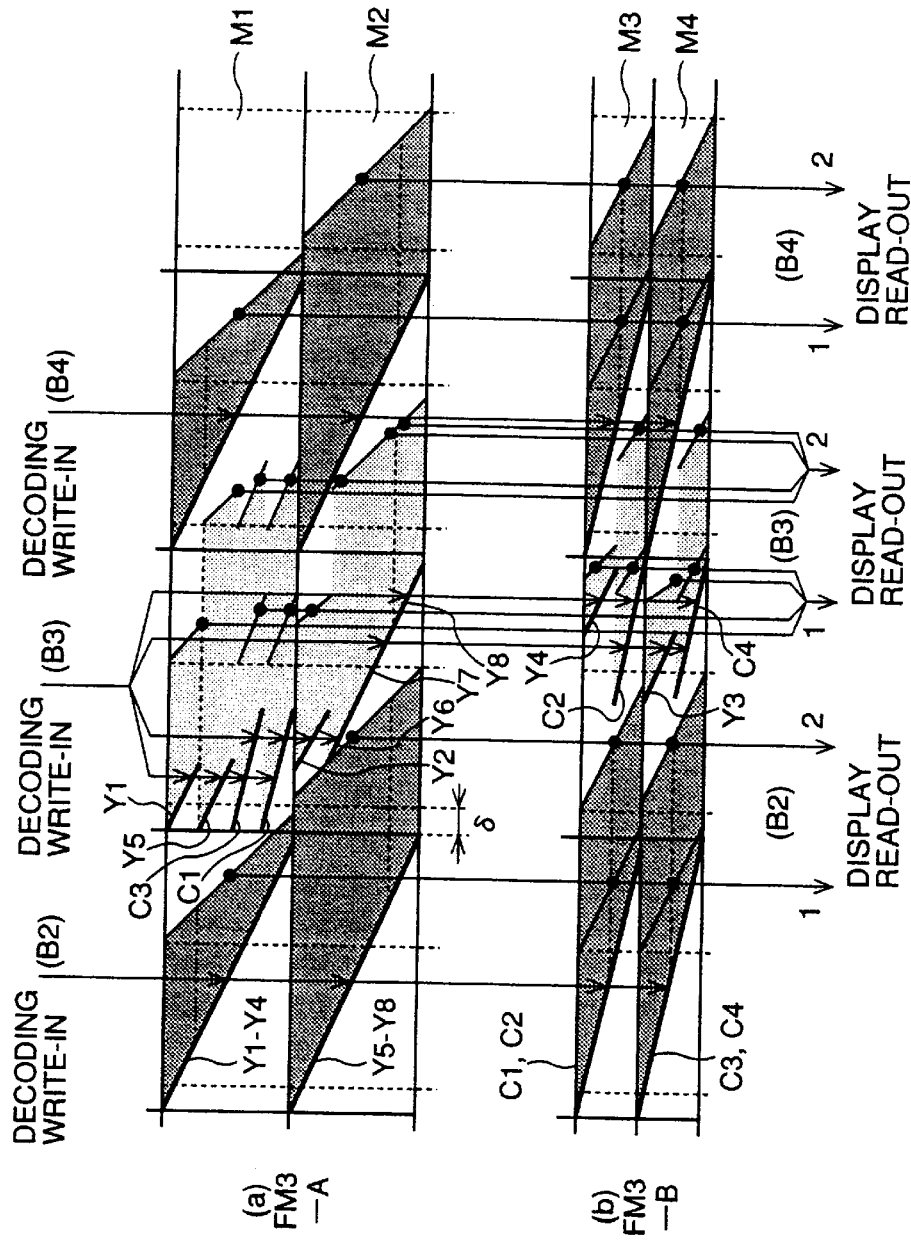
FIG. 26 is a diagram showing the memory control of the B picture frame memory of the sixth embodiment.

Next, the decoding and writing operation and the display read-out operation in the frame memory area FM-A, FM-B in the sixth embodiment (in this case, these frame memory areas correspond to the frame memory areas FM3-A, FM3-B of the frame memory FM3) will be described by exemplifying the B2, B3 and B4 frames. FIG. 26 shows the display read-out operation when each of the color difference types of the B2, B3, B4 frames is the frame format, In the B2, B4 frames to which the memory map 1 is applied, the time transition of the address area in which the frame memory FM3 is occupied is illustrates as being densely crosshatched, and in the frame B3 to which the memory map 2 is applied, the time transition of the address area in which the frame memory FM3 is occupied is illustrated as being lightly crosshatched. In FIG. 25, the two types of memory maps 1 and 2 are illustrated by the same crosshatches.

In the memory map 1, the decoding and writing operation of the reproduction brightness data of the first and second fields are performed on the field memories M1 and M2, and the decoding and writing operation of the reproduction color difference data C of the first and second fields are performed on the field memories M3 and M4. Here, Y1, Y2, Y3, . . . , Y7, Y8 indicate memory units to which the reproduction brightness data Y are allocated every ¼ field from the head of the first field of the reproduction brightness data Y in this order, and likewise C1, C2, C3, C4 indicate memory units to which the reproduction color difference data C are allocated every ½ field from the head of the first field of the reproduction color difference data in this order. The shift speed of the write-in address of the decoding and writing operation of the brightness data Y is equal to double the shift speed of the write-in address of the decoding and writing operation of the color difference data C.

In the case of the memory map 2, the following decoding and writing operation is carried out. That is, in the frame memory area FM-A, in the four field memories M1 from the head in the arrangement order, the first quarter brightness data Y of the first field, the first quarter brightness data Y of the second field, the first half of color difference data C of the second field and the first half of color difference data C of the first field start to be simultaneously and in parallel decoded and written into the head memory unit Y1, the second memory unit Y5, the third memory unit C3 and the fourth memory unit C1, respectively. When the half field period elapses, the decoding and writing operation of the memory units Y1 and Y5 is completed, and the decoding and writing operation of the second quarter brightness data Y of the first field and the second quarter brightness data Y of the second field in the first and second memory units Y2, Y6 of the field memory M2 respectively is started. Thereafter, when the one-field period elapses, the decoding and writing operation of the color difference data C in the memory units C1, C3 of the field memory M1 is completed. Further, the decoding and writing operation of the memory units Y2, Y6 in the field memory M2 is also completed.

With this operation, the decoding and writing operation of the third quarter brightness data Y of the first field is started in the memory unit Y3 of the field memory M4 of the frame memory area FM-B, and the decoding and writing operation of the third quarter brightness data Y of the second field is also started in the third memory unit Y7 of the frame memory area FM-A. In the frame memory area FM-B, the decoding and writing operation of the residual half color difference data C of the first field is started in the memory unit C2 of the field memory M3, and the decoding and writing operation of the residual half color difference data C of the second field is started in the memory unit C4 of the field memory M4. Thereafter, when the period of 3/2 field elapses, the decoding and writing operation of the brightness data Y in the memory unit Y3 of the field memory M4 and the memory unit Y7 of the field memory M2 is completed. Thereafter, the decoding and writing operation of the last quarter brightness data Y of the first field is started in the memory unit Y4 of the field memory M3 of the frame memory area FM-B, and the decoding and writing operation of the last quarter brightness data Y of the second field is started in the fourth memory unit Y8 of the field memory M2 of the frame memory area FM-A. When the two-field period, that is, the one-frame period elapses, the decoding and writing operation of the color difference data C in the memory unit C2 of the field memory M3 and the memory unit C4 of the field memory M4 is finished. Further, the decoding and writing operation of the brightness data Y in the memory unit Y4 of the field memory M3 and the memory unit Y8 of the field memory M2 is finished, and the decoding and writing operation of the B3 frame by the memory map 2 is finished.

In the display read-out operation of the brightness data Y and the color difference data C, the display read-out operation of the color difference data C is performed so that the color difference data C of the same color are read out repetitively twice irrespective of the memory map 1,2 when the color difference type is the frame format.

In the sixth embodiment, as in the case of the fifth embodiment, a predetermined time lag $\delta$ is provided in addition to the one field period between the decoding period of the coded picture data of each frame and the display period of the decoded picture data, and the densely crosshatched portion and the lightly crosshatched portion are not overlapped in FIG. 26 because the memory maps 1 and 2 are switched as shown in FIG. 25.

As shown in FIG. 26, in the sixth memory unit of the frame memory area FM3-A, the time lag δ is set to an intermediate value of a permissible time range so that the decoding and writing operation of the B3 frame based on the memory map 2 precedes the display read-out operation of the B2 frame based on the memory map 1, and the decoding and writing operation of the B4 frame based on the memory map 1 precedes the display read-out operation of the B3 frame based on the memory map 2. The permissible time lag range has the width of about a 30-line period when the decoding processing corresponding to the NTSC system is performed, and it has the width of about a 40-line period when the signal processing corresponding to the PAL system is performed.

In the sixth embodiment, irrespective of the memory map 1,2, the arrangement of the six memory units Y1, Y6, Y7, Y8, C2, C2 is fixed. The arrangement of the remaining six memory units Y2 Y3, Y4, Y5, C1, C3 is varied due to the switching operation of the memory maps 1,2. The arrangement of the memory units which provides the same effect as this embodiment is not limited to the above arrangement, and it may be such an arrangement as shown in FIG. 21 in which the two memory units Y1 and Y6 are fixed while the remaining ten memory units Y2, Y3, Y4, Y5, Y7, Y8, C1, C2, C3 and C4 is varied.

Next, a seventh embodiment of the decoding/displaying device for coded picture data according to the present invention will be described.

The construction of the seventh embodiment is identical to that of FIG. 18. In the MPEG system, the digital picture signals of a film source which comprise twenty four frames per second are coded while keeping the number of frames, and in the decoding process, these coded signals can be output and displayed while converted to TV signals of the NTSC system comprising about thirty frames per second. At this time, each originally progressive scan frame is decoded and then output for display as two fields or three fields of the interlace scan. In the case of the three-field display, the same decoded picture data as the first field are also output in the last field. The switching operation of the two types of display periods of the 2-field display and the 3-field display can be performed every frame, and, for example, they are alternately switched every frame. The seventh embodiment corresponds to this style.

Display period information indicating the 2-field display or 3-field display is multiplexed with the coded picture data as coded additive information. Further, display start field information indicating which one of two fields constituting one frame of interlace scan the first field corresponds to, is also multiplexed with the coded picture data as coded additive information.

Figure 27:
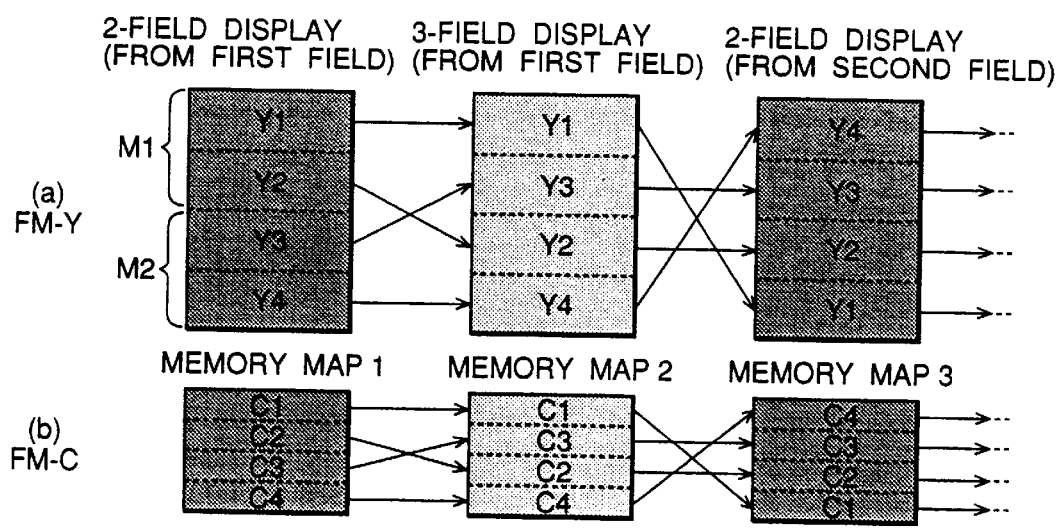
FIG. 27 is a diagram showing the switching operation of the frame memory map of a seventh embodiment.

FIG. 27 shows the switching operation of the memory maps of the frame memories FM1 to FM3 in the memory 218 of FIG. 18 in the seventh embodiment. In the seventh embodiment, unlike each of the embodiments described above, four types of memory maps are set. As the respective frame memories FM1, FM2, FM3 the frame memory area FM-Y for brightness data Y and the frame memory area FM-C for color difference data C are provided as shown in FIG. 27. Each frame memory area is divided into four memory units each having equal capacity. Each of the memory units Y1, Y2, Y3, Y4 has a storage capacity for storing brightness data of a half field, and each of the memory units C1, C2, C3, C4 has a storage capacity for storing color difference data of a half field. This divisional operation is the same as FIG. 20, but the switching method of the memory maps, that is, the method of allocating these memory units to the picture data in accordance with the four kinds of memory maps is different from that of the fifth embodiment shown in FIG. 20.

Next, the decoding and writing operation and the display read-out operation of the frame memory areas FM-Y, FM-C (in this case, these frame memory areas corresponds to the frame memory areas FM3-Y, FM3-C of the frame memory FM3) in the seventh embodiment will be described on the basis of the B2, B3, B4 frames with reference to FIG. 28.

Figure 28:
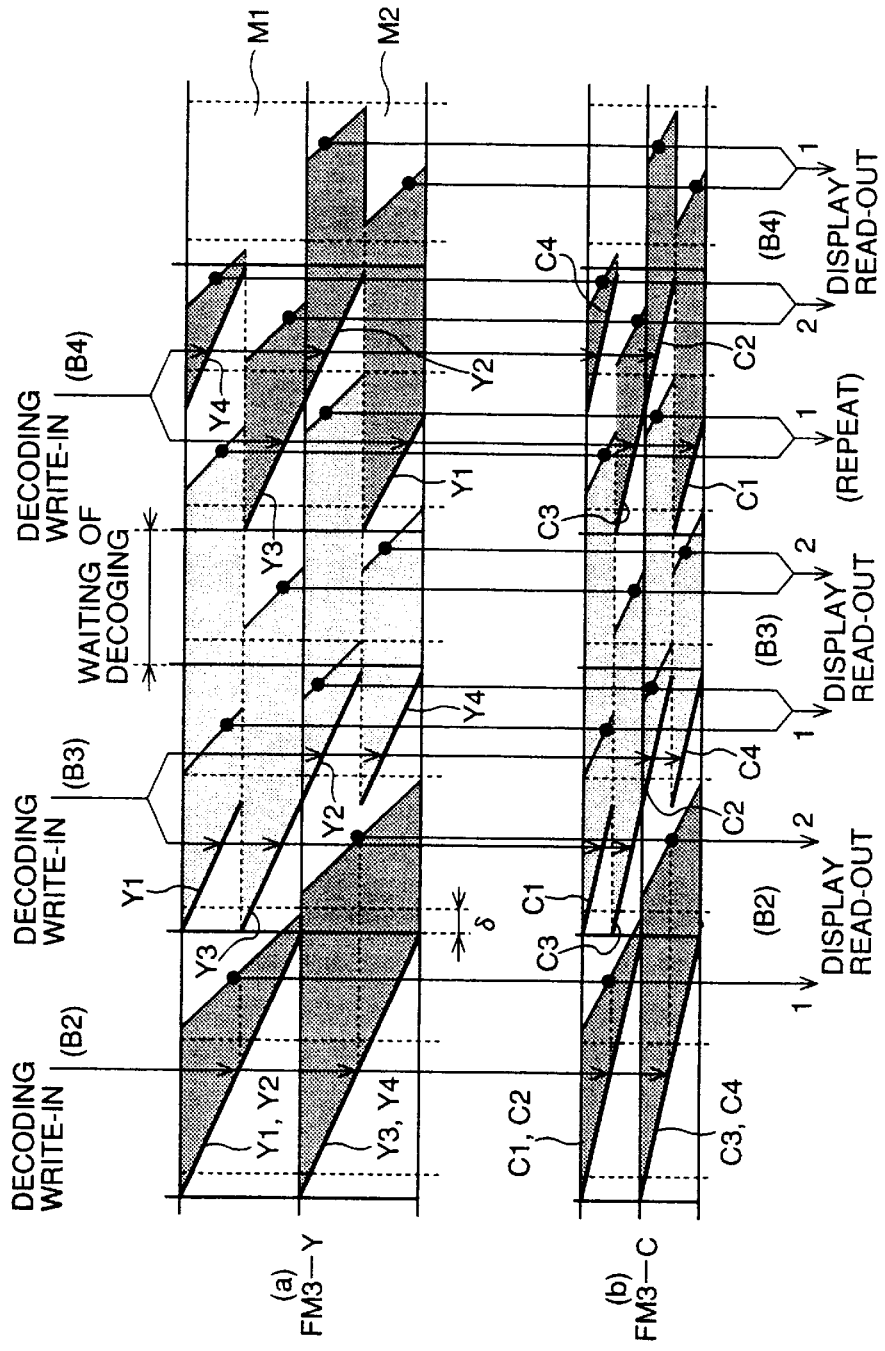
FIG. 28 is a diagram showing the memory control of the B picture frame memory of the seventh embodiment.

FIG. 28 shows the flow of the decoding and displaying processing and the timing thereof when the B2 frame is subjected to the 2-field display from a first field of the B2 frame (hereinafter a field which is one of two fields constituting one frame and whose line position is located at the upper side on the screen is referred to as the "first field"), then the B3 frame is subjected to the 1-field display from the first field thereof, and then the B4 frame is subjected to the 2-field display from a second field (hereinafter a field which is one of two fields constituting one frame and whose line position is located at the lower side on the screen is referred to as the "second field"). In the B2 frame to which the memory map 1 is applied and the B4 frame to which the memory map 3 is applied, the time transition of the address area in which the frame memory FM3 is occupied is illustrated as being densely crosshatched, and in the B3 frame to which the memory map 2 is applied, the time transition of the address area in which the frame memory FM3 is occupied is illustrated as being lightly crosshatched. This is satisfied in FIG. 27, and the memory maps 1,2 and 3 are discriminated from one another with the same crosshatches. In FIG. 28, the case where the memory map 4 is applied is not shown, but there is actually a case where the memory map 4 is applied, as will be described later.

The same is applied to the frame memory areas FM-Y, FM-C, and thus only the decoding and writing operation and the display read-out operation of the frame memory area FM-Y will be described.

In FIG. 28, the decoding and writing operation of the B2 frame is identical to that of the fifth embodiment. The memory map 1 is set in the frame memory FM3 as shown in FIG. 27, and the decoded picture data of the first field and the decoded picture data of the second field are successively and in parallel written into the field memory M1 (memory units Y1, Y2) and the field memory M2 (memory units Y3, Y4) respectively. The display and read-out operation of the B2 frame is the same as the fifth embodiment.

The decoding and writing operation of the B3 frame is the same as the fifth embodiment. The memory map 2 shown in FIG. 27 is set in the frame memory FM3, and the decoded picture data of the first half portions of the first and second fields are written into the field memory M1 (memory units Y1, Y3), and then the decoded picture data of the last half portion of the first and second fields are written in parallel into the field memory M2 (memory units Y2, Y4). However, unlike the fifth embodiment, the display read-out operation of the B3 frame is started from the first field and carried out over the period of three fields. At this time, the decoded picture data of the first field are read out for display in the last field, and the same decoded picture data as the first field are output for display. In the display of the last field, the display of the first field is repeated. The display processing is performed over the 3-field period, and the decoding processing ends in the period of one frame, that is, the 2-field period.

During the decoding and writing operation of the B4 frame, the memory map 3 shown in FIG. 27 is set in the frame memory FN3, and the decoded picture data of the first field and the decoded picture data of the second field are successively and in parallel written into the field memory M2 (memory units Y1, Y2) and the field memory M1 (memory units Y3, Y4). The display read-out operation of the B4 frame is started from the second field and carried out over the 2-field period. In the arrangement of the memory units Y1, Y2, Y3, Y4, the memory units Y2 and Y3 are rearranged in the switching operation from the memory map 1 to the memory map 2, and the memory units Y1 and Y4 are rearranged in the switching operation from the memory map 2 to the memory map 3.

Like the fifth embodiment, in the seventh embodiment, in addition to the 1-field period, a predetermined time lag δ is provided between the decoding period of the coded picture data of each frame and the display period of the decoded picture data, and the densely crosshatched portion and the light crosshatched portion in FIG. 28 are not overlapped with each other because the memory maps 1,2,3 are switched from one to the other as shown in FIG. 27. In the seventh embodiment, in actual fact, the switching operation of the four kinds of memory maps can be performed. The memory maps are successively switched according to a predetermined rule in accordance with the difference between the 2-field display and the 3-field display, the difference being that the display start field is the first field or the second field.

Next, the rule of the switching operation of the memory maps will be described hereunder.

Figure 29:
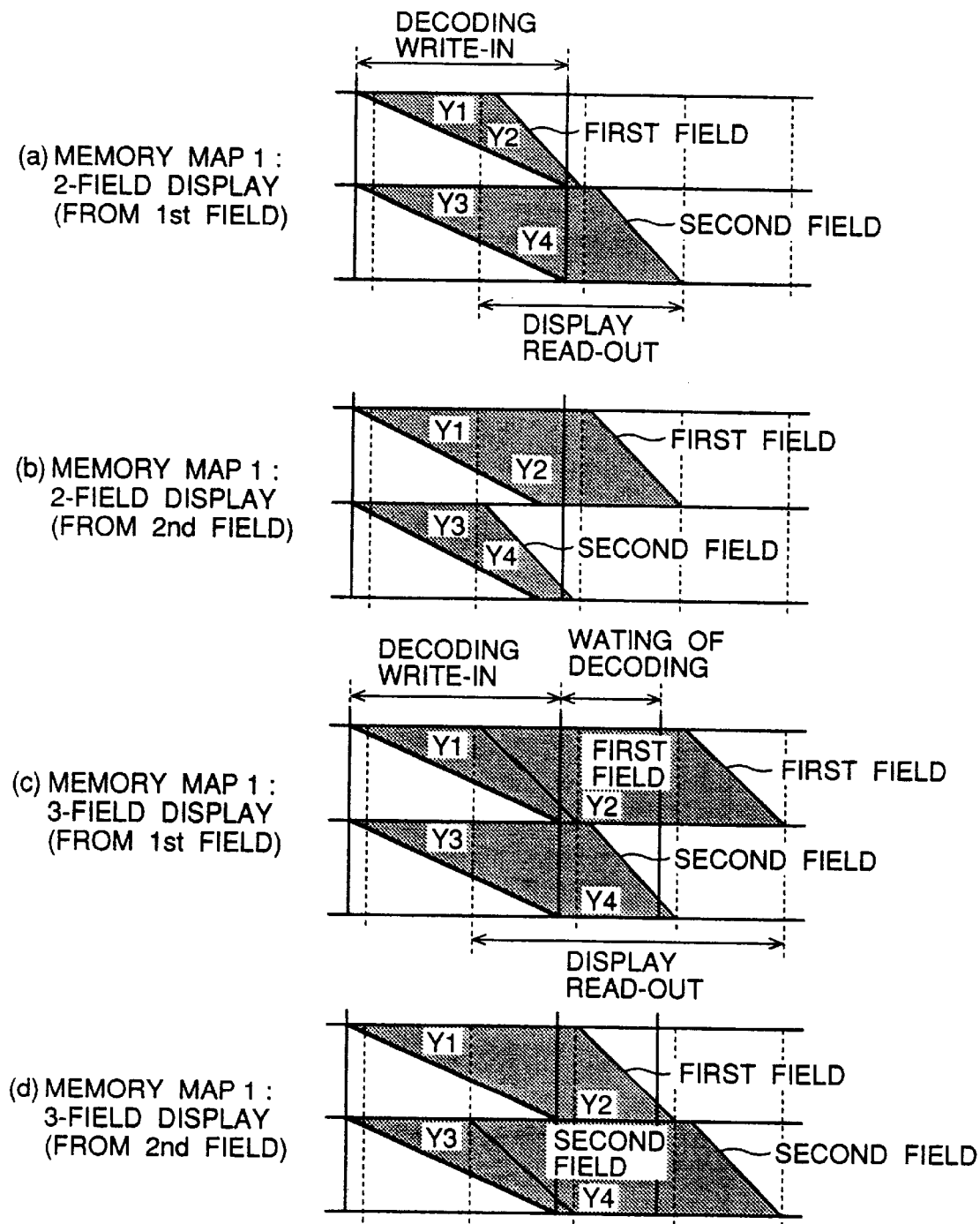
FIG. 29 is a diagram showing the display read-out control of the frame memory of the seventh embodiment.

FIG. 29 is a diagram showing the decoding and writing operation and the display read-out operation of decoded picture data of one frame to any one of the frame memories FM1 to FM3, and shows the case where the memory map 1 is set in the frame memory. In FIG. 28, the time transition of the address area in which the frame memory is occupied is illustrated as being crosshatched.

As described above, the frame to be decoded and written into the frame memory in which the memory map 1 is set is classified into the following cases (a) to (d) in accordance with the difference between the 2-field display and the 3-field display and the difference in that the display start field is the first field or the second field. In any case, the decoding and writing operation is the same, but the display read-out operation is varied. In FIG. 28, the B2 frame in which the decoding and writing operation into the frame memory FM3 is performed on the basis of the memory map 1 corresponds to the case of (a).

As is apparent from the time transition of the occupied address area which is shown with crosshatches, in the cases (a) and (d) where the display read-out operation ends with the second field, the occupied address area is gradually released with the lapse of time, and the same condition is satisfied in both cases. There is only the difference in that the release timing of the (d) case is later than that of the (a) case by the one-field period. In these cases, in order to set the memory map 2 in the decoding and writing operation of the B3 frame next to the B2 frame corresponding to (a) of FIG. 28, the memory map may be switched from the memory map 1 to the memory map 2 when the next frame is decoded and written.

Likewise, in the cases (b) and (c) where the display and readout operation ends with the first field, it is satisfied in both cases that the occupied address area is gradually released with the lapse of time, Therefore, the memory map may be switched from the memory map 1 to the other memory map 4 when the next frame is decoded and written. The memory map 4 has the construction in which the memory units Y1, Y3 constituting the field memory M1 and the memory units Y2, Y4 constituting the field memory M2 are replaced with each other in the memory map 2. That is, in the arrangement of the memory units Y1, Y2. Y3, Y4, the memory units Y1 and Y4 are replaced (rearranged) with each other in the switching operation from the memory map 1 to the memory map 4.

In FIG. 29, the decoding and writing operation and the display read-out operation to the frame memory in which the memory map 1 is set are classified into four cases. With respect to the other memory maps 2,3,4, the decoding writing operation and the display read-out operation are likewise classified into four cases. Accordingly, when the case (a),(d) is applied to the frame which is decoded and written to the frame memory, the memory map may be switched to another one when the decoding and writing operation of the next frame is performed. In the case of (b), (c), the memory map may be further switched to another memory map when the decoding and writing operation of the next frame is performed.

Figure 30:
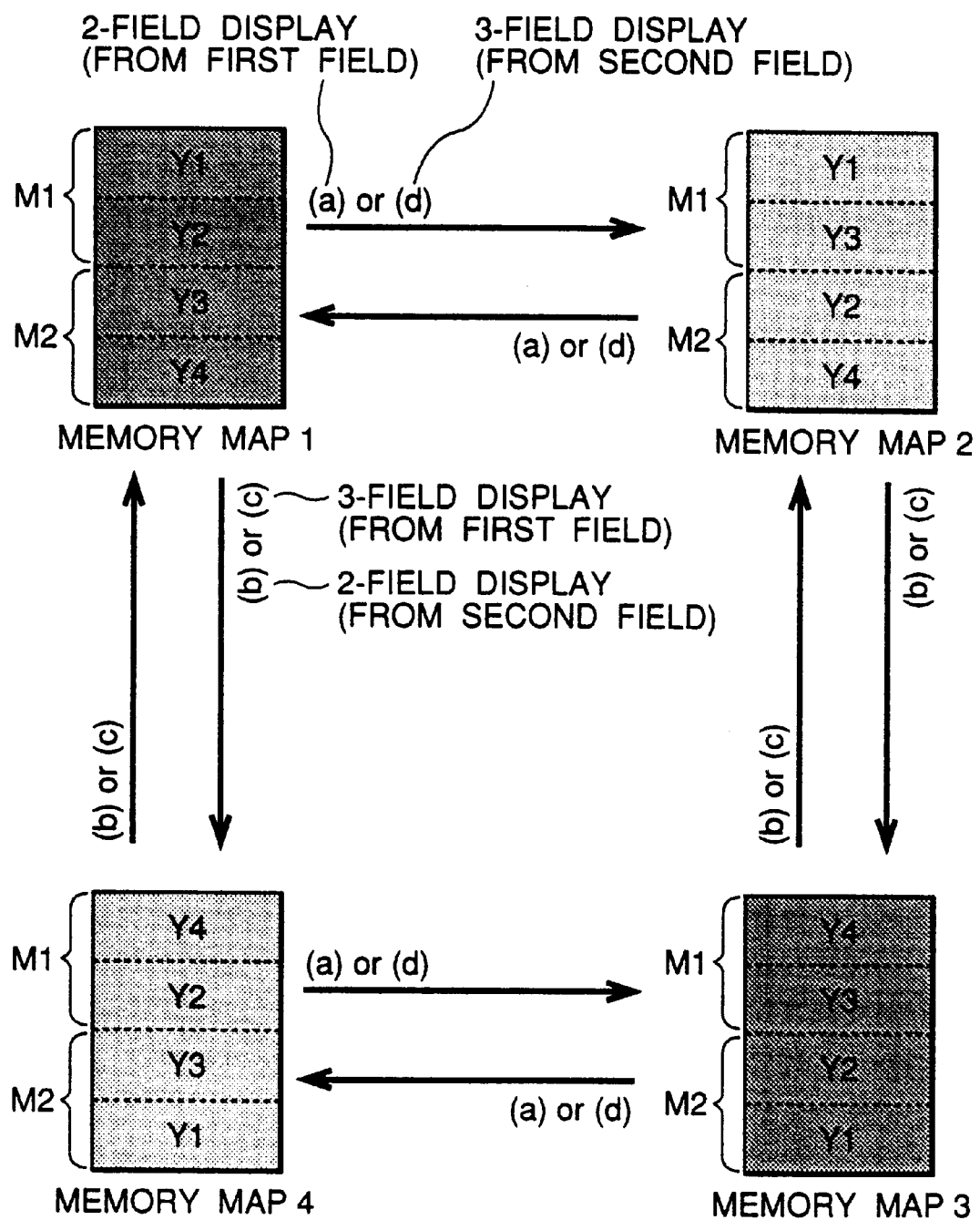
FIG. 30 is a diagram showing the transition of the switching operation of the frame memory map of the seventh embodiment.

FIG. 30 is a transition diagram showing the switching operation of four kinds of memory map according to the rule of the memory map switching as described above. In FIG. 30, the transition between the memory maps is represented by arrows. With respect to each memory map, the arrangement of the memory units in the frame memory area FM-Y for brightness data Y is shown.

The four kinds of memory maps 1,2,3,4 are arranged in a ring shape, and each memory map is changed to another memory map in accordance with one of the cases (a) to (d) which is applied to the frame which is decoded and written to the frame memory. Actually, the memory map is changed to another memory map in one of two transition modes when the case (a), (d) is applied to the decoded and written frame or the case (b),(c) is applied to the decoded and written frame. For example, the memory map 1 is changed to the memory map 2 in the case of (a),(d), and to the memory map 4 in the case of (b),(c). The same transition is performed from the other memory maps 2,3,4.

The switching operation of the four kinds of memory map is performed as described above. A series of fields to be output for display must be an alternate arrangement of first and second fields. Therefore, there is actually no possibility that the frame of (b),(c) in which the display read-out starts with the second field is subsequent to the frame of (a), (d) in which the display read-out ends with the second field. Likewise, there is also no possibility that the frame of (a),(c) in which the display read-out starts with the first field is subsequent to the frame of (b),(c) in which the display read-out ends with the first field.

Figure 31:
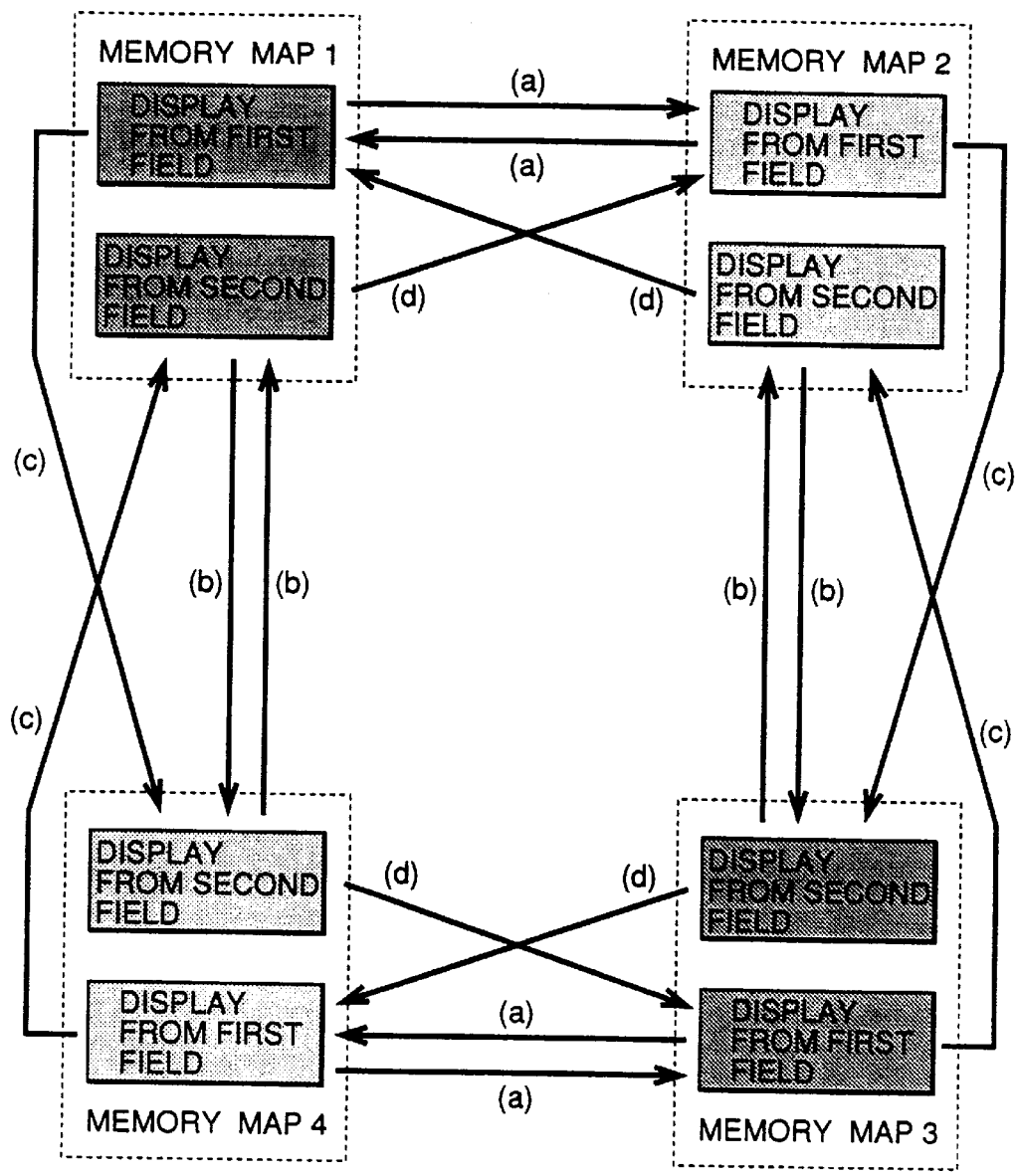
FIG. 31 is a diagram showing the transition of the switching operation of the frame memory map of the seventh embodiment.

FIG. 31 is a memory map transition diagram obtained by redrawing the memory map transition diagram of FIG. 30 in consideration of the above restriction. In FIG. 31, the case where the frame decoded and written to the frame memory is the case (a), (c) in which the display starts with the first field, and the cases where the frame decoded and written to the frame memory is the case (b),(c) in which the display starts with the second field are separately illustrated for the respective memory maps.

In both the cases, the memory map is the same, but the time transition of the address area in which the frame memory is occupied is different.

In the seventh embodiment described above, the construction of the frame memory address generator 212 corresponds to the construction of the fifth embodiment which is partially provided with signal lines. The difference from the frame memory address generator 212 of the first embodiment shown in FIG. 23 resides in that not only the information on the picture coding type, but also the information of the display period indicating the 2-field display or the 3-field display, and the information of the display start field indicating whether the first (top) field is the first field or the second field are supplied as the coding additive information to be supplied from the VLC decoding circuit 206 (FIG. 18).

The bank information generator 224 is supplied with not only the information on the picture coding type, but also the information of the display period, and the bank numbers for the reference read-out operation, the decoding and writing operation and the display read-out operation which indicate any one of the frame memories FM1 to FM3, and the map mode indicating one of the memory maps 1, 2, 3, 4 to which the frame memory corresponding to each bank number is set, are generated and output. In the bank information generator 224, the memory maps of the respective frame memories are managed as shown in the transition diagram of the memory maps shown in FIG. 30. The display read-out address generator 223 is supplied with the information of the display period and the information of the display start field, and the address signal generating method of the logical address corresponding to the memory map 1 for the display read-out operation corresponding to the frame memories FM1 to FM3 is switched.

Next, an eighth embodiment of the decoding/displaying device for coded picture data according to the present invention will be described.

The construction of the eighth embodiment is the same as FIG. 18. The eighth embodiment meets the switching operation between the two kinds of display periods of the 2-field display and the 3-field display like the seventh embodiment, and at the same time meets the switching operation between the two kinds of color difference types of the field format and the frame format like the sixth embodiment. That is, in the seventh embodiment, when the decoded picture data of the 4:2:0 format are converted to the data of the 4:2:2 format, the line number of the two kinds of color difference signal is interpolated so as to be double on a field basis because this embodiment meets only the case where the color difference type is the field format. However, the eighth embodiment meets the case where the color different type is the frame format, and thus the line number of the two kinds of color difference signals can be interpolated so as to be double on a frame basis.

Figure 32:
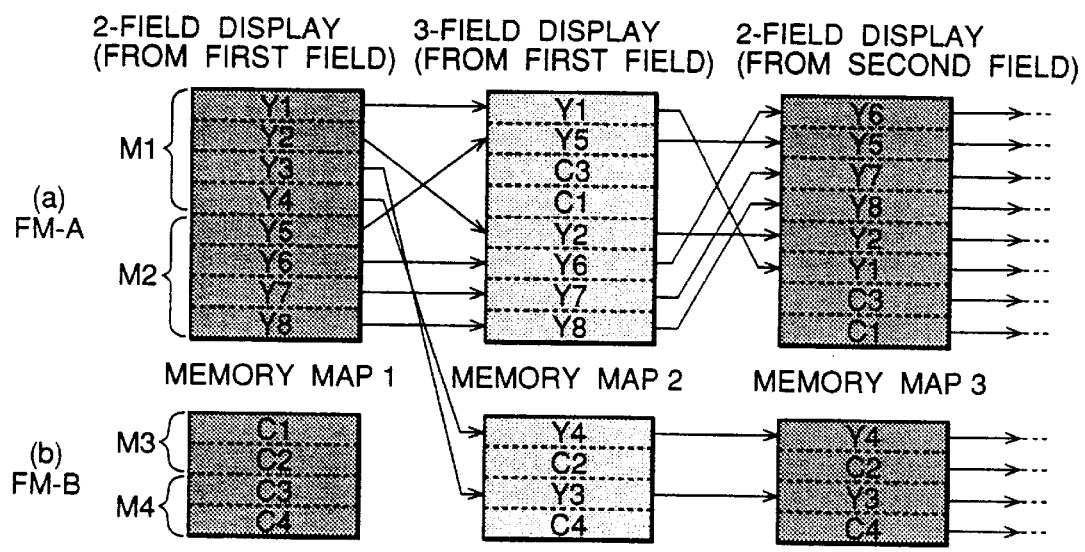
FIG. 32 is a diagram showing the switching operation of the frame memory map of an eighth embodiment.

FIG. 32 shows the switching operation of the memory maps of the frame memories FM1 to FM3 in the memory 218 of FIG. 18 according to the eighth embodiment. In the eighth embodiment, unlike the above-described embodiments, twelve kinds of memory map are set up. There are frame memory areas FM-A and FM-B corresponding to the combination of the frame memory area for brightness data Y and the frame memory area FM-C for color difference data C are provided for each of the frame memories FM1, FM2, FM3 as shown in FIG. 32. The frame memory area FM-A is divided into eight memory units, and the frame memory area FM-B is divided into four memory units, so that a total of twelve memory units having the same size are set. This method of division is the same as FIGS. 21 and 25. However, the switching method of the memory maps, that is, the method of allocating the memory units corresponding to the twelve kinds of memory map to the picture data is different from that of the fifth embodiment shown in FIGS. 21 and 25.

Next, the decoding and writing operation and the display read-out operation of the frame memory areas FM-A and FM-B of the eighth embodiment (in this case, these frames correspond to the frame memory areas FM3-A, FM3-B of the frame memory FM3) will be described on the basis of the B2, B3, B4 frames with reference to FIG. 33.

Figure 33:
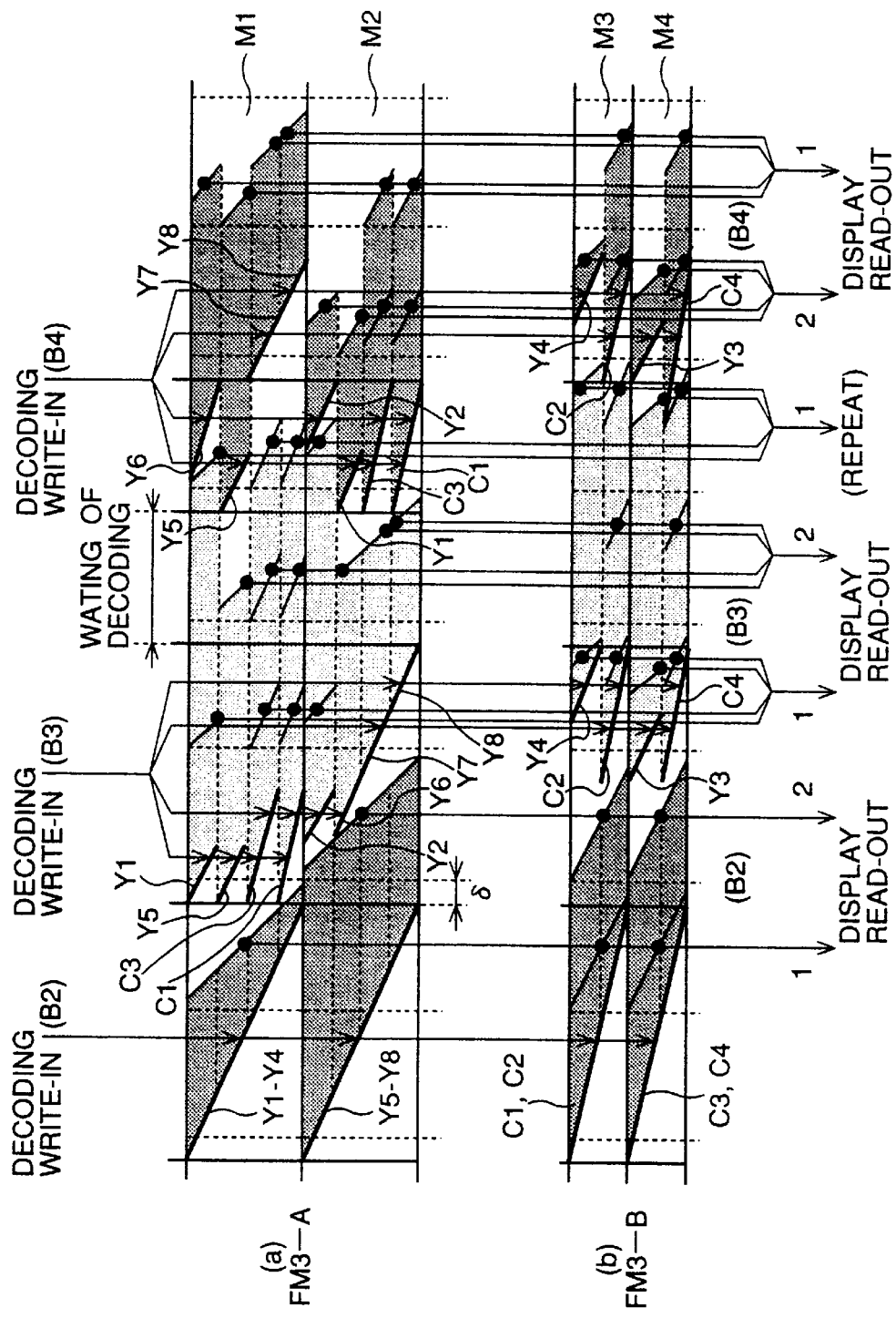
FIG. 33 is a diagram showing the memory control of the B picture frame memory of the eighth embodiment.

FIG. 33 shows the flow of the decoding and displaying processing and the timing thereof when the 2-field display is performed on the B2 frame from the first field, then the 3-field display is performed on the B3 frame from the first field, and then the 2-field display is performed on the B4 frame from the second field as in the case of the seventh embodiment shown in FIG. 28. Further, FIG. 33 shows the display read-out operation when any of the color different types of the B2, B3, B4 frames is the frame format as the same as in the case of the sixth embodiment shown in FIG. 25. In the B2 frame to which the memory map 1 is applied and the B4 frame to which the memory map 3 is applied, the time transition of the address area in which the frame memory FM3 is occupied is illustrated with dense crosshatches. In the B3 frame to which the memory map 2 is applied, the time transition of the address area in which the frame memory FM3 is occupied is illustrated with light crosshatches. In FIG. 32, the memory maps are also discriminated from one another by the same crosshatches. FIG. 33 does not show the case where the other memory maps 4,5, . . . 12, are applied, but there are some cases where these memory maps are actually applied, as will be described later.

In FIG. 33, the decoding and writing operation and the display read-out operation of the B2 frame are the same as the sixth embodiment. The memory map 1 shown in FIG. 32 is set for the frame memory FM3. The decoding and writing operation of the B3 frame is the same as the sixth embodiment. Further, the memory map 2 shown in FIG. 32 is set for the frame memory FM3. However, the display read-out operation of the B3 frame is different from that of the sixth embodiment, and it starts from the first field and is carried out over the period of three fields. It is the same as the seventh embodiment in that the 3-field display is performed, but it is different from the seventh embodiment in that the same color data C are repetitively read out for display in each field to meet the case where the color difference type is the frame format.

For the decoding and writing operation of the B4 frame, the memory map 3 shown in FIG. 32 is set for the frame memory FM3, and the decoded picture data of the first field and the decoded picture data of the second field are successively written in parallel to a predetermined series of memory units respectively, as shown in FIG. 33. The series of memory units are determined in accordance with the memory map 3, and the detailed description thereof is omitted. In the switching operation from the memory map 1 to the memory map 2, the six memory units Y2, Y3, Y4, Y5, C1, C3 of the twelve memory units are rearranged (i.e., replaced with one another). On the other hand, in the switching operation from the memory map 2 to the memory map 3, the six memory units Y1, Y6, Y7, Y8, C1, C3 are rearranged.

In the eighth embodiment, as in the case of the sixth embodiment, a predetermined time lag δ is provided in addition to the one-field period between the decoding period of the coded picture data of each frame and the display period of the picture data, and the switching operation of the memory maps 1, 2, 3 is performed as shown in FIG. 32, so that the densely crosshatched portion and the lightly crosshatched portion in FIG. 33 are not overlapped with each other. In this eighth embodiment, the switching operation of the twelve kinds of memory map is actually performed, but the memory map is successively switched to another one according to a predetermined rule in accordance with the difference in display mode (2-field display or 3-field display) and the difference in display start field (the first field or the second field).

Next, the switching rule of the memory maps as described above will be described.

Figure 34:
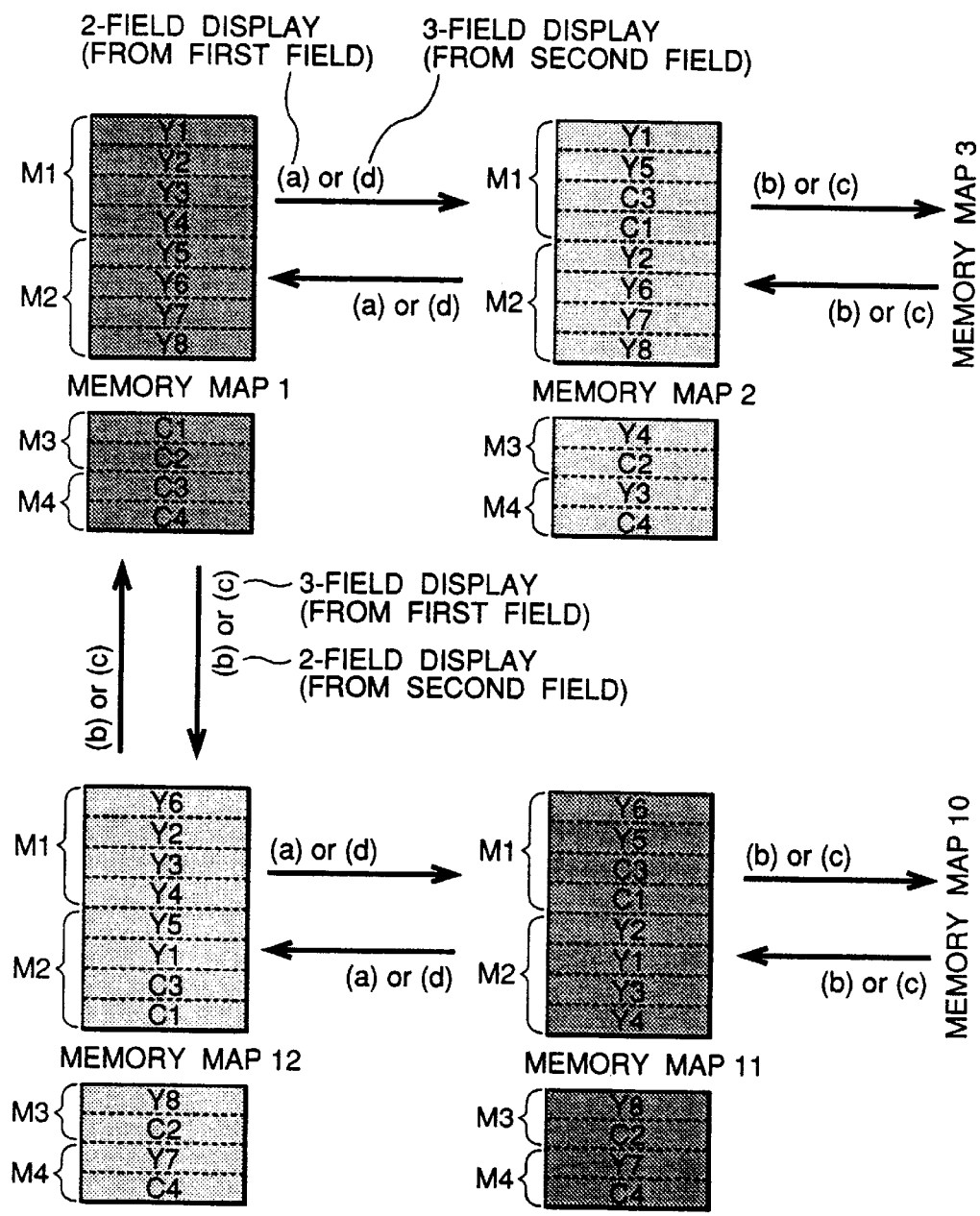
FIG. 34 is a diagram showing the transition of the switching operation of the frame memory map of the eighth embodiment.
Figure 35:
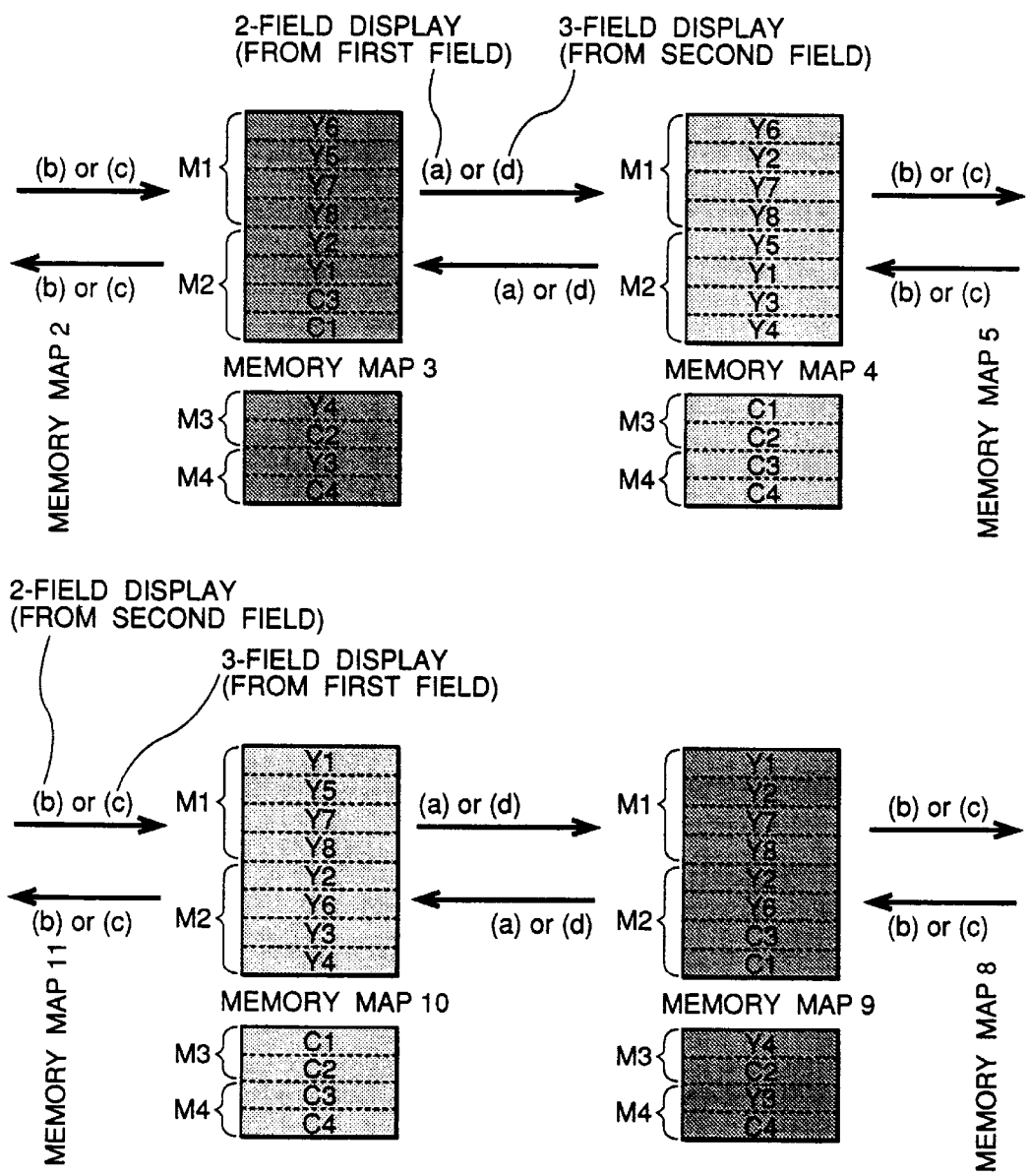
FIG. 35 is a diagram showing the transition of the switching operation of the frame memory map of the eighth embodiment.
Figure 36:
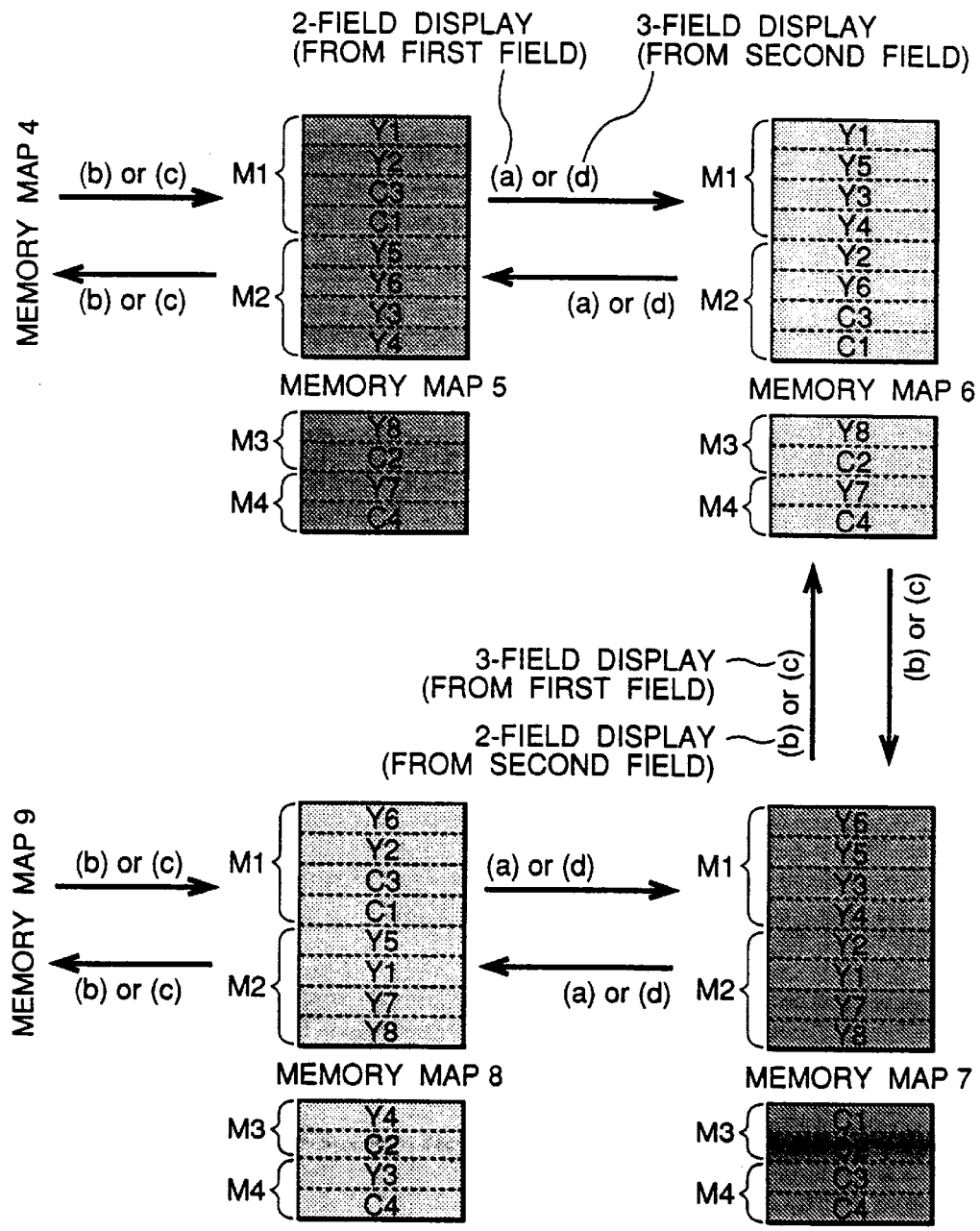
FIG. 36 is a diagram showing the transition of the switching operation of the frame memory map of the eighth embodiment.

As shown in FIG. 29 which is used for the description of the seventh embodiment, in each memory map, the frame which is decoded and written to the frame memory is classified into four cases (a) to (d) in accordance with the difference in display mode (2-field display or 3-field display) and the difference in display start field (first field or second field). In each memory map, the decoding and writing operation is the same in any case, but the display read-out operation is different among these cases. In the cases (a), (d) where the display read-out operation ends with the second field, they are the same in that the occupied address area is gradually released with the lapse of time, and thus the memory map may be switched to another memory map when the decoding and writing operation of the next frame is performed. Likewise, in the cases (b), (c) where the display read-out operation ends with the first field, they are same in that the occupied address area is gradually released with the lapse of time, and thus the memory map may be switched to another one when the decoding and writing operation of the next frame is performed FIGS. 34, 35 and 36 show a series of transition diagrams showing the switching operation of the twelve kinds of memory map according to the predetermined memory map switching rule as described above. The transition diagram of one memory map is completed by connecting FIG. 35 to the right side of FIG. 34 and connecting FIG. 36 to the right side of FIG. 35. In the FIGS. 34, 35 and 36, the transition between the memory maps is indicated by an arrow. Further, for each memory map, the arrangement of the memory units in the frame memory area FM-Y for brightness data Y is shown.

The twelve kinds of memory maps 1,2,3, . . . , 12 are arranged in a ring shape, and each memory map is changed to another memory map in accordance with which one of the cases (a) to (d) is applied to the frame which is decoded and written to the frame memory. Actually, there are two possible transitions from each memory map to one of different memory maps in accordance with the case (a), (d) or (b),(c) which is applied to the decoded and written frame. For example, the memory map 1 is changed to the memory map 2 in the case of (a),(d), and to the memory map 12 in the case of (b), (c). The same transition is performed from each of the other memory maps 2, 3, . . . , 12.

The switching operation of the twelve kinds of memory map is performed as described above. However, the fields to be output for display must be formed so that first and second fields are alternately arranged. Therefore, there is actually no possibility that the frame of (b), (c) in which the display read-out starts with the second field is subsequent to the frame of (a), (d) in which the display read-out ends with the second field. Likewise, there is also no possibility that the frame of (a), (c) in which the display read-out starts with the first field is subsequent to the frame of (b), (c) in which the display read-out ends with the first field. In consideration of such a restriction, the memory map transition diagram shown in FIGS. 34, 35 and 36 may be rewritten as in the case of the relationship between FIG. 31 and FIG. 30 with respect to the seventh embodiment, and the description thereof is omitted.

In the eighth embodiment, the construction of the frame memory address generator 212 of FIG. 18 corresponds to the construction of the seventh embodiment which is partially added to signal lines. The difference is that as the coding additive information to be supplied from the VLC decoding circuit 206 (FIG. 18), there are supplied not only the information on the picture coding type, the information of the display period and the information of the display start field, but also the information on the color difference type indicating the field format or the frame format. The display read-out address generator 223 is supplied with the color difference type information, and the address signal generating method of the address to be read out for display is switched.

The above-described first to eighth embodiments may be provided with two operation modes so as to be applicable not just to TV signals of one of the NTSC system or the PAL system, but to TV signals of both the NTSC and PAL systems. It is apparent that the presents invention is applicable to HDTV signals having a different resolution.

Further, in the above-described embodiments, the fixed time lag δ is added to the one-field period between the decoding period of the coded picture data of each frame and the display period of the decoded picture data. However, the time lag δ may be varied insofar as it is within a permissible time range.

Still further, in the above-described embodiments, the coded picture data of each frame are decoded according to a predetermined fixed time slot which is synchronized with the display timing. However, the decoding is not necessarily performed on the basis of the fixed time slot. However, it is necessary that an average of the decoding of the coded picture data of one frame ends within the frame period, and thus it is necessary to control the progress of the decoding. According to the present invention, since the time lag δ to be added to the one-field period between the decoding period and the display period has some time width, the time lag δ may be set to the center of the permissible time range to determine an ideal decoding timing, and the decoding timing may be controlled at any time during the progress of the decoding operation so that the time lag (advance or delay) of the actual decoding timing to the ideal decoding timing is kept within the permissible time range.

As described above, the present invention makes the most of the memory capacity of a 16 Mbit memory which is easily available as a generally-used memory, and performs the decoding operation of the coded picture data without providing the decoding waiting period. In addition, OSD for displaying decoded pictures while characters or graphics are overlaid on the pictures, and the decoding of audio data can be performed. Further, the letter-box picture conversion can be performed without increasing the decoding processing speed.

What is claimed is:

1. A decoding/displaying device for decoding coded picture data which are coded by a hybrid technique of intra-frame, predictive inter-frame and bi-directional inter-frame coding, the device comprising:

decoding means for receiving and decoding coded picture data;

memory means for storing coded picture data and decoded picture data obtained by said decoding means;

display means for reading the decoded picture data from said memory means and outputting display picture data; and control means for controlling operation timing of said decoding means and said display means, wherein said memory means is connected to said decoding means and said display means, and contains a plurality of frame memories for storing said decoded picture data, wherein said decoding means decodes coded picture data with a first picture aspect ratio to generate said decoded picture data and said display means outputs display picture data with a second picture aspect ratio, and wherein the second picture aspect ratio is narrower than the first picture aspect ratio and a number of effective scanning lines of said display picture data is less than that of said coded picture data.

2. A decoding/displaying device as claimed in claim 1, wherein said decoding means decodes the coded picture data to generate decoded picture data and writes the decoded picture data in said memory means even during a vertical blanking period of said display picture data.

3. A decoding/displaying device as claimed in claim 1, including:

scanning line converting means for decreasing the number of effective scanning lines of said coded picture data.

4. A decoding/displaying device as claimed in claim 3, wherein said scanning line converting means decreases the number of effective scanning lines of said coded picture data coded by intra-frame and predictive inter-frame coding before writing said decoded picture data to said memory means, and decreases the number of effective scanning lines of said coded picture data coded by bi-directional inter-frame coding after reading said decoded picture data from said memory means.

5. A decoding/displaying device as claimed in claim 1, wherein a scanning line converting means decreases the number of effective scanning lines of said coded picture at a ratio of 4:3 so that a picture having a first aspect ratio of 16:9 is displayed on a display having a second aspect ratio of 4:3 .

6. A decoding/displaying apparatus for decoding coded picture data which are coded by a hybrid technique of intra-frame, predictive inter-frame and bi-directional inter-frame coding, the device comprising:

decoding means for receiving a decoding coded picture data;

memory means for storing coded picture data and decoded picture data obtained by said decoding means;

display means for reading the decoded picture data from said memory means and generating display picture data;

outputting means for outputting said display picture data; and control means for controlling operation timing of said decoding means and said display means, wherein said memory means is connected to said decoding means and said display means, and contains a plurality of frame memories for storing said decoded picture data, wherein said decoding means decodes coded picture data with a first picture aspect ratio to generate said decoded picture data and said display means outputs display picture data with a second picture aspect ratio, and wherein the second picture aspect ratio is narrower than the first picture aspect ratio and a number of effective scanning lines of said display picture data is less than that of said coded picture data.

7. A decoding/displaying apparatus as claimed in claim 6, wherein said decoding means decodes the coded picture data to generate decoded picture data and writes the decoded picture data in said memory means even during a vertical blanking period of said display picture data.

8. A decoding/displaying apparatus as claimed in claim 6, including:

scanning line converting means for decreasing the number of effective scanning lines of said coded picture data.

9. A decoding/displaying apparatus as claimed in claim 8, wherein said scanning line converting means decreases the number of effective scanning lines of said coded picture data coded by intra-frame and predictive inter-frame coding before writing said decoded picture data to said memory means, and decreases the number of effective scanning lines of said coded picture data coded by bi-directional inter-frame coding after reading said decoded picture data from said memory means.

10. A decoding/displaying apparatus as claimed in claim 6, wherein a scanning line converting means decreases the number of effective scanning lines of said coded picture at a ratio of 4:3 so that a picture having a first aspect ratio of 16:9 is displayed on a display having a second aspect ratio of 4:3.

* * * * *